US012376208B2

(12) United States Patent
Rossi et al.

(10) Patent No.: US 12,376,208 B2
(45) Date of Patent: Jul. 29, 2025

(54) CONTROLLING ENERGY EFFICIENCY IN LED DRIVE CIRCUITS

(71) Applicant: OMRON Corporation, Kyoto (JP)

(72) Inventors: Matthew Rossi, Renton, WA (US); Jesse Kolstad, Renton, WA (US); George Zhang, Renton, WA (US)

(73) Assignee: OMRON Corporation, Kyoto (JP)

( * ) Notice: Subject to any disclaimer, the term of this patent is extended or adjusted under 35 U.S.C. 154(b) by 111 days.

(21) Appl. No.: 18/211,229

(22) Filed: Jun. 16, 2023

(65) Prior Publication Data

US 2024/0422872 A1 Dec. 19, 2024

(51) Int. Cl.
*H05B 45/12* (2020.01)
*H05B 45/345* (2020.01)
*H05B 45/3725* (2020.01)

(52) U.S. Cl.
CPC .......... *H05B 45/12* (2020.01); *H05B 45/345* (2020.01); *H05B 45/3725* (2020.01)

(58) Field of Classification Search
CPC ... H05B 45/12; H05B 45/345; H05B 45/3725
See application file for complete search history.

(56) References Cited

U.S. PATENT DOCUMENTS 6,584,283 B2 6/2003 Gabello et al.
7,385,402 B2 6/2008 Yen
7,710,253 B1 5/2010 Fredricks
8,487,546 B2 * 7/2013 Melanson .......... H05B 45/327 315/297
9,374,863 B2 6/2016 Wang
9,491,845 B2 * 11/2016 Melanson .......... H05B 45/10
9,668,311 B1 5/2017 Chen
2006/0001381 A1 * 1/2006 Robinson .......... H05B 45/3725 315/291

(Continued)

FOREIGN PATENT DOCUMENTS

CN 201345764 Y 11/2009
CN 111801989 A * 10/2020 .......... F21K 9/272

(Continued)

*Primary Examiner* — Abdullah A Riyami
*Assistant Examiner* — Syed M Kaiser
(74) *Attorney, Agent, or Firm* — Morgan, Lewis & Bockius LLP

(57) ABSTRACT

This application is directed to controlling the illumination efficiency of a light emitting diode (LED) operation system, which includes an LED module and a current source. A power supply is configured to provide a configurable drive voltage. The LED module is coupled to the power supply interface and configured to be driven by the configurable drive voltage. The current source is (i) coupled to the power supply interface via the LED module and (ii) configured to stabilize a drive current of the LED module dynamically at a target drive current and hold an illumination efficiency of an LED operation system above a target efficiency level. In some embodiments, the current source includes a drive transistor coupled in series with the LED module. The current source is configured to hold the illumination efficiency of the LED operation system by controlling the drive transistor to operate in a linear region.

20 Claims, 8 Drawing Sheets

(56) References Cited

U.S. PATENT DOCUMENTS

| | | | | |
|---|---|---|---|---|
| 2012/0299480 | A1* | 11/2012 | Peting | H05B 47/185 315/185 R |
| 2016/0219658 | A1* | 7/2016 | Xiong | H05B 45/50 |
| 2018/0324916 | A1* | 11/2018 | Lai | H05B 45/3725 |
| 2023/0109205 | A1* | 4/2023 | Xiong | F21V 23/023 315/127 |

FOREIGN PATENT DOCUMENTS

| | | | | |
|---|---|---|---|---|
| TW | 201547319 | A | 12/2015 | |
| WO | WO-2020044174 | A1 * | 3/2020 | H05B 45/10 |

* cited by examiner

CONTROLLING ENERGY EFFICIENCY IN LED DRIVE CIRCUITS

TECHNICAL FIELD

The disclosed embodiments relate generally to electronic circuits and more specifically to systems, devices, and methods for adjusting the drive voltage of one or more light emitting diodes (LEDs) to control the efficiency of an LED operation system driving the LEDs.

BACKGROUND

LEDs are applied to provide a wide variety of illumination solutions, such as environmental lighting and backlighting on mobile devices. Optical data-reading systems and devices (e.g., scanning devices) also apply LEDs to illuminate an object, thereby enabling identification and tracking of the object. When the object is illuminated by the LEDs, a two-dimensional (2D) image is captured for a symbol (e.g., a barcode, a label, or a part marking) that is included on a part. The 2D image is analyzed to extract the information contained in the symbol. In some embodiments, the LEDs provide structured light to illuminate the object to facilitate information extraction from the symbol attached on the object. Compared with other light sources, LEDs offer advantages for energy consumption, lifetime, physical robustness, size, and switching rate. However, many LED illumination systems focus on maintaining a constant drive voltage or a constant drive current, and oftentimes compromise on energy efficiency.

SUMMARY

Various embodiments of this application are directed to adjusting the drive voltage of an LED module to control the efficiency of an LED illumination system (including the LED module) above a target efficiency level. The LED module includes a single LED or a plurality of LEDs that are coupled in an LED string. The drive voltage of the LED module is adjusted to keep a substantially constant drive current in the LED module, while controlling (e.g., minimizing) the voltage drop and the power level of one or more transistors configured to drive the LED module. The one or more transistors are controlled to operate in a linear region, thereby keeping substantially low equivalent resistance compared with high equivalent resistance of transistors operating in the saturation region. Particularly, as the LED module is driven by a substantially constant current, the LEDs of the LED module provide a substantially constant brightness level. The drive voltage is self-calibrated to adapt to variation in the operating forward voltage of the LEDs, drift in the operating temperature, or both. This allows the same circuit to drive LEDs of different light colors over their entire current ranges in a power efficient manner.

In some embodiments, a voltage adjustment network includes one or more of: a closed-loop calibration system, forward voltage compensation logic, temperature compensation logic, and a controller. In an example, the target drive current is selected in a continuous drive current range of the LED module. In another example, the target drive current is selected from a plurality of predefined drive currents of the LEDs of the LED module. Each LED is driven with the target drive current, so that each LED can deliver a target brightness level. The closed-loop calibration system is configured to keep the target drive current, thereby stabilizing the brightness level of the LEDs. In some situations, the calibration system sweeps the drive voltage of the LED module within a drive voltage range and identifies a target drive voltage that enables the target drive current and a substantially high efficiency level, which is above a target efficiency level. The target drive voltage is determined based on LED parameters corresponding to the substantially constant drive current. In some embodiments, the controller controls the calibration system to adjust the drive voltage in response to change in the drive current. Additionally, as the temperature changes, the temperature compensation logic is enabled to control adjustment of the drive voltage, thereby maintaining the substantially high efficiency level of the calibration system. In some embodiments, the calibration system is applied to control forward voltage variations caused by one or more of drive current, light color, manufacturing variation, temperature, and device aging. In some embodiments, the closed-loop calibration system is applied to provide a drive voltage of a laser, a sensing element, or a diode device, while enhancing the efficiency level of an associated driver system using a transistor. In some embodiments, the controller includes an integrated circuit and is implemented at the hardware level with a first reaction time. Alternatively, the controller can be implemented, at least partially, in software with a second reaction time, which is longer than the first reaction time.

In one aspect, an electronic device includes a power supply interface, an LED module, and a current source. The power supply interface is configured to provide a configurable drive voltage. The LED module is coupled to the power supply interface and configured to be driven by the configurable drive voltage. The current source is coupled to the power supply interface via the LED module, and configured to stabilize the drive current of the LED module dynamically at a target drive current and hold the illumination efficiency of an LED operation system above a target efficiency level. The LED operation system includes the LED module and the current source. In some embodiments, the current source includes a drive transistor that is coupled in series with the LED module, and the current source is configured to hold the illumination efficiency of the LED operation system above the target efficiency level by controlling the drive transistor to operate in the linear region while stabilizing the drive current of the LED module at the target drive current.

In another aspect, a method is implemented by an electronic device to provide efficient LED operation. The method includes generating a configurable drive voltage to drive an LED module, stabilizing by a current source the drive current of the LED module dynamically at a target drive current, and holding the illumination efficiency of the LED operation system, including the LED module and the current source, above the target efficiency level.

In yet another aspect, a method is implemented for providing an electronic device. The method includes providing a power supply interface configured to provide a configurable drive voltage and providing an LED module coupled to the power supply interface. The LED module is configured to be driven by the configurable drive voltage. The method further includes providing a current source coupled to the power supply interface via the LED module. The current source is configured to stabilize the drive current of the LED module dynamically at a target drive current and hold the illumination efficiency of an LED operation system above the target efficiency level. The LED operation system includes the LED module and the current source.

In accordance with some embodiments, an electronic device includes one or more processors, memory, and one or more programs stored in the memory. The programs are configured for execution by the one or more processors. The one or more programs include instructions for performing any of the methods described herein.

In accordance with some embodiments, a non-transitory computer-readable storage medium stores one or more programs configured for execution by an electronic device having one or more processors and memory. The one or more programs include instructions for performing any of the methods described herein.

Thus methods, systems, and devices are disclosed that enable optimal design, execution, and performance of barcode scanners.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the entire inventive subject matter.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF EMBODIMENTS

Various embodiments of this application are directed to adjusting the drive voltage of an LED module to control the efficiency of an LED illumination system, including the LED module, above the target efficiency level. The LED module includes a single LED or a plurality of LEDs arranged in an LED string. The drive voltage of the LED module is adjusted to keep a substantially constant current in the LEDs of the LED module, while controlling (e.g., minimizing) the voltage drop and the power level of one or more transistors configured to drive the LEDs. The one or more transistors are controlled to operate in the linear region, thereby keeping substantially low equivalent resistance compared with high equivalent resistance of transistors operating in the saturation region. As the one or more transistors stay in the linear region, the efficiency of the LED illumination system is controlled at an efficiency level above the target efficiency level (e.g., at a maximized efficiency level corresponding to the substantially constant current). Additionally, given that the LED module is driven by a substantially constant drive current, the LED module provides a substantially constant brightness level. The drive voltage is self-calibrated to adapt to variation in the operating forward voltage of the LEDs, drift in the operating temperature, or both. This allows the same circuit to drive one or more LEDs of different light colors over their entire current ranges in a power efficient manner.

Figure 1A:
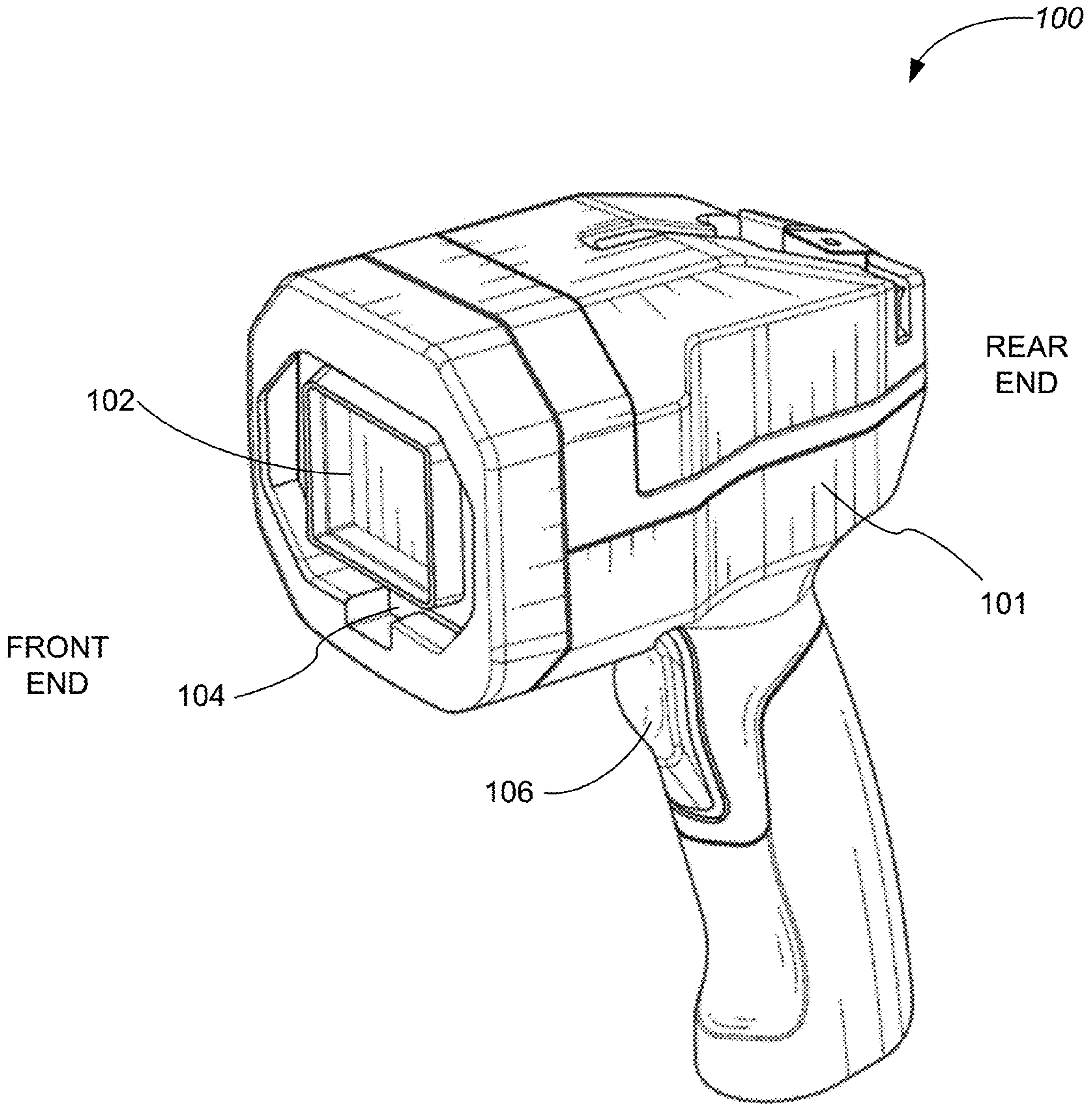
FIGS. 1A and 1B are perspective views of two example electronic devices, in accordance with some embodiments.
Figure 1B:
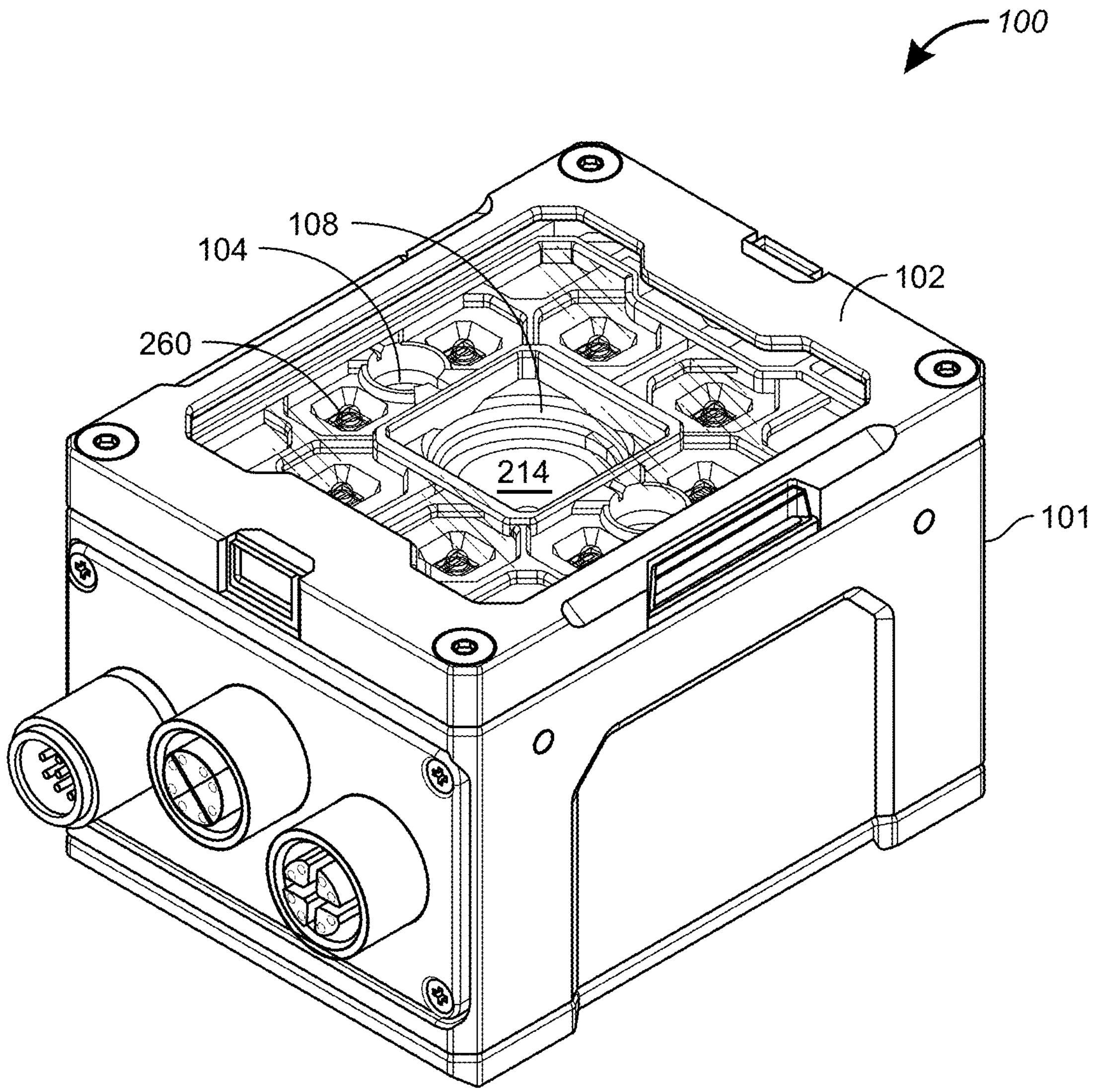

FIGS. 1A and 1B are perspective views of two example electronic devices 100, in accordance with some embodiments. According to some embodiments of the present disclosure, the electronic device 100 is a scanning device. In some embodiments, the electronic device 100 can also be referred to as a code reader, a barcode scanner, a label scanner, an optical scanner, or an image capture system. Referring to FIG. 1A, in some embodiments, the electronic device 100 is a handheld device. Referring to FIG. 1B, in some embodiments, the electronic device 100 is a fixed device. In some embodiments, the electronic device 100 is mounted on a stand. In some embodiments, the electronic device 100 is part of an optical data reading system (e.g., a label scanning station).

The electronic device 100 includes a housing 101 (e.g., a body or an exterior case) for protecting components that are located inside the electronic device 100. In some embodiments, the housing 101 includes integrated fittings or brackets to keep the internal components in place. Referring to FIG. 1A, in some embodiments, the electronic device 100 includes a front cover 102 positioned at a front end of the electronic device 100. Referring to FIG. 1B, in some embodiments, the electronic device 100 includes a top cover 102 positioned at a top surface of the electronic device 100. In some embodiments, the front cover 102 is transparent or partially transparent.

According to some embodiments of the present disclosure, the electronic device 100 includes one or more distance sensors 104 (e.g., internal distance sensors) that are positioned within the electronic device 100. For example, referring to FIG. 1, a distance sensor 104 is positioned inside the electronic device 100 (e.g., adjacent to the front cover 102), and faces the front end of the electronic device 100. In some embodiments, each distance sensor 104 includes one or more of: a time-of-flight (TOF) sensor, an ultrasonic sensor, a radar sensor, a light detection and ranging (LiDAR) sensor, and an infrared (IR) distance sensor.

In some embodiments, the distance sensor 104 is a TOF sensor. A TOF sensor measures the elapsed time from the emission of a signal (e.g., a wave pulse, an LED pulse, a laser pulse, or IR waves) from the sensor to the moment it returns to the sensor after reflecting off an object. Distance is then calculated by using the speed of light in air and the time between sending/receiving the signal.

In some embodiments, the distance sensor 104 is an ultrasonic sensor. An ultrasonic sensor, or a Sonar sensor, detects the distance to an object by emitting high-frequency sound waves. The ultrasonic sensor emits high-frequency sound waves towards a target object, and a timer is started. The target object reflects the sound waves back towards the sensor. A receiver picks up the reflected wave and stops the timer. The time taken for the wave's return is calculated against the speed of sound to determine the distance travelled.

In some embodiments, the distance sensor 104 is a radar sensor. The radar sensor (e.g., radar distance sensor) transmits high frequency radio waves (e.g., microwaves) and calculates the distance to an object by measuring the reflection of the radio waves from the object. In some embodiments, the radar sensor is configured to determine the distance, angle, and radial velocity of an object relative to the location of the electronic device 100.

In some embodiments, the distance sensor 104 is a LiDAR sensor, which measures the range of a target object through light waves from a laser (e.g., instead of radio or sound waves).

In some embodiments, the distance sensor 104 is an infrared (IR) distance sensor. An IR distance sensor works through the principle of triangulation, measuring distance based on the angle of the reflected beam.

In some embodiments, the electronic device 100 includes two or more distance sensors 104, each having the same type (e.g., each of the two or more distance sensors is a TOF sensor). In some embodiments, the electronic device 100 includes two or more distance sensors, at least two of which are of distinct types (e.g., the electronic device 100 includes a TOF distance sensor and a radar sensor).

Referring to FIG. 1A, in some embodiments, the electronic device 100 includes a button 106 (e.g., a trigger) for activating the electronic device 100. Further, in some embodiments, in response to a press on the button 106, the electronic device 100 activates one or more light sources 260 (FIG. 2) to start a read cycle.

Referring to FIG. 1B, in some embodiments, the electronic device 100 further includes a plurality of light sources 260 (e.g., 8 light emitting diodes (LEDs) in FIG. 1A) mounted on a printed circuit board (PCB) 108. A light source 260 is also called a lighting source, an illumination source, or an illuminator. In some embodiments, the light sources 260 are part of an illumination system of the electronic device 100, which also includes illuminators (e.g., bright field and dark field illuminators), a reflector, and a lighting module. In some embodiments, the electronic device 100 includes a camera 214. A lens of the camera 214 is exposed via an opening of the PCB 108 and physically surrounded by the light sources 106. The light sources 260 are grouped into a plurality of illumination units (e.g., a first illumination unit and a second illumination unit). Each illumination unit is configured to be independently controlled to illuminate a distinct region of the field of view of the camera 214. In an example, every two light sources 260 near a corner of the top cover 102 are grouped to form an illumination unit. Four illumination units are independently controlled to illuminate respective regions of a field of view of the camera 214 in a sequential or concurrent manner.

Figure 2:
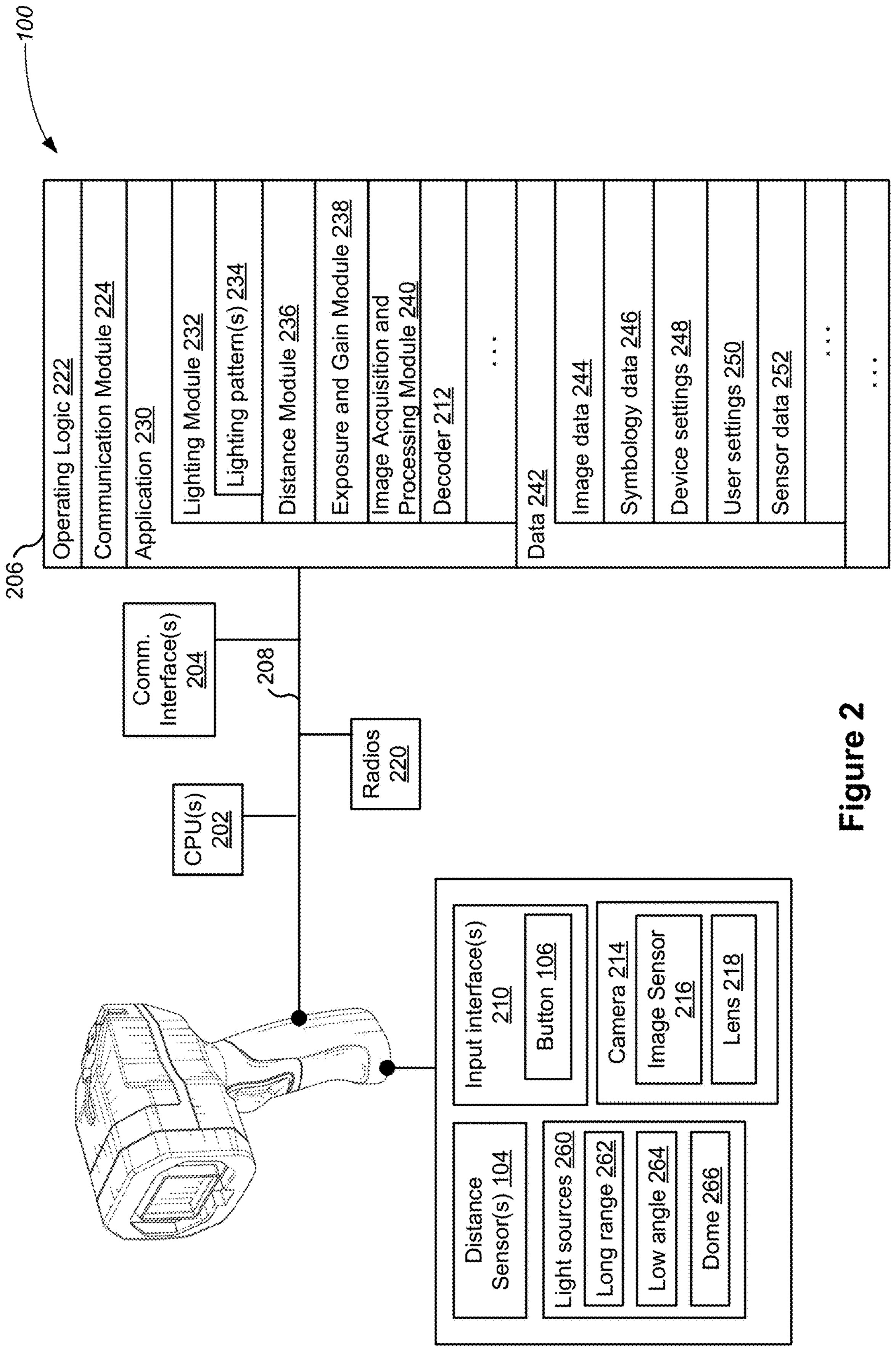
FIG. 2 is a block diagram of an example electronic device, in accordance with some embodiments.

FIG. 2 is a block diagram of an example electronic device 100, in accordance with some embodiments. The electronic device 100 includes one or more distance sensors 104, as described previously with respect to FIG. 1. In some embodiments, the one or more distance sensors 104 include one or more of: a time-of-flight sensor, an ultrasonic sensor, a radar sensor, or a LiDAR sensor. In some embodiments, the electronic device 100 includes one or more proximity sensors for sensing (e.g., detecting) if an object is within the sensing area where the proximity sensor is designed to operate. In some embodiments, the electronic device 100 uses distance measuring techniques, such as an image focus finder, analog-to-digital conversion (ADC), and/or digital-to-analog conversion (DAC), to determine the distance between a target object and the electronic device 100.

The electronic device 100 includes light sources 260. In some embodiments, the light sources 260 include a long range light source 262, a low angle light source 264, and/or a dome light source 266, as described in FIG. 3 and in U.S. patent application Ser. No. 14/298,659, filed Jun. 6, 2014, entitled "Combination Dark Field and Bright Field Illuminator," now U.S. Pat. No. 8,989,569, which issued on Mar. 24, 2015 and is incorporated by reference herein in its entirety.

In some embodiments, the electronic device 100 includes a decoder 212 for decoding data contained in a barcode and sending the data to a computer device. In some embodiments, the decoder 212 is part of a software application 230. Details of the decoder 212 are described in U.S. patent application Ser. No. 14/298,659, filed Jun. 6, 2014, entitled "Combination Dark Field and Bright Field Illuminator," now U.S. Pat. No. 8,989,569, which issued on Mar. 24, 2015 and is incorporated by reference herein in its entirety.

In some embodiments, the electronic device 100 includes one or more input interfaces 210 for facilitating user input, such as the button 106 in FIG. 1. In some embodiments, the electronic device 100 is a battery-operated device and includes a rechargeable battery. In this instance, the input interface 210 can include a charging port for charging the battery.

In some embodiments, the electronic device 100 includes a camera 214, which includes an image sensor 216 and a lens 218. The lens 218 directs the path of light rays and concentrates them onto the image sensor 216, to re-create the image as accurately as possible on the image sensor. The image sensor 216 converts light (e.g., photons) into electrical signals that can be interpreted by the electronic device 100. In some embodiments, the lens 218 is an optical lens and is made from glass or other transparent material. In some embodiments, the lens 218 is a liquid lens that is composed of an optical liquid material, and whose shape, focal length, and/or working distance varies when a current or voltage is applied to the liquid lens. In some embodiments, the electronic device 100 (e.g., via the processor(s) 202) uses distance information obtained by the distance sensor 104, to determine the optimal current or voltage to apply to the liquid lens 218 so as to have the optimal focal length for decoding the barcode data contained in an image. In some embodiments, the camera 214 is configured to capture images in color. In some embodiments, the camera 214 is configured to capture images in black and white.

The electronic device 100 also includes one or more processors (e.g., CPU(s)) 202, one or more communication interface(s) 204 (e.g., network interface(s)), memory 206, and one or more communication buses 208 for interconnecting these components (sometimes called a chipset).

In some embodiments, the electronic device 100 includes radios 220. The radios 220 enable one or more communication networks, and allow the electronic device 100 to communicate with other devices, such as a computer device or a server. In some embodiments, the radios 220 are capable of data communication using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, Ultrawide Band (UWB), and/or software defined radio (SDR)), custom or standard wired protocols (e.g., Ethernet or HomePlug), and/or any other suitable communication protocol, including communication protocols not yet developed as of the filing date of this patent application.

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processor(s) 202. The memory 206, or alternatively the non-volatile memory within the memory 206, includes a non-transitory computer-readable storage medium. In some embodiments, the memory 206, or the non-transitory computer-readable storage medium of the memory 206, stores the following programs, modules, and data structures, or a subset or superset thereof:

- operating logic 222, including procedures for handling various basic system services and for performing hardware dependent tasks;
- a communication module 224 (e.g., a radio communication module), which connects to and communicates with other network devices (e.g., a local network, such as a router that provides Internet connectivity, networked storage devices, network routing devices, server systems, computing devices, and/or other connected devices) coupled to one or more communication networks via the communication interface(s) 204 (e.g., wired or wireless);
- an application 230, which acquires images that contain labels (e.g., barcodes) and decodes the labels, and controls one or more components of the electronic device 100 and/or other connected devices in accordance with the determined state. In some embodiments, the application 230 includes:
  - a lighting module 232, which selects and deploys (e.g., based on distance measurements, such as direct measurements from the distance sensor(s) 104 or indirect measurements) one or more light sources 260 and/or sequences of lighting patterns 234 for a current read cycle;
  - a distance module 236, which determines (e.g., selects) which sequence of focus distances to be employed during the current read cycle, based on distance measurements from the distance sensor(s) 104;
  - an exposure and gain module 238, which samples images 244 captured by the camera 214;
  - an image acquisition and processing module 240, which acquires and processes images; and
  - a decoder 212 for decoding data contained in a barcode and sending the data to a computer device;
- data 242 for the electronic device 100, including but not limited to:
  - image data 244 (e.g., camera data);
  - symbology data 246 (e.g., types of codes, such as bar codes);
  - device settings 248 for the electronic device 100, such as default options, image acquisition settings (e.g., exposure and gain settings), and preferred user settings; and
  - user settings 250, such as a preferred level of humidity, and/or a preferred shade for the lenses 108 (e.g., for photochromic lenses); and
  - sensor data 252 that is acquired (e.g., measured) from the distance sensor(s) 104 and/or other sensors that are included in the electronic device 100.

In some embodiments, the distance sensor 104 is monitored by the lighting module 232. When the user commences a current read cycle, the distance sensor 104 identifies a distance field (e.g., near field, medium field, or far field) corresponding to the location of the target object. The lighting module 232 selects a lighting sequence, corresponding to the distance field, for execution. If a good read was achieved in a previous read cycle (e.g., a good read from the third lighting pattern of the near field lighting sequence), and the current read cycle has the same distance field as the previous read cycle, the application 230 will commence the current read cycle by using values of the earlier good read (e.g., the third lighting pattern of the near field lighting pattern, the previous focus position, the exposure, and/or the gain), before starting the lighting sequence from the beginning. Users are typically reading many similar parts, and the apparatus can achieve a good read sooner if it starts with known good settings from the last decode operation. If no previous settings lead to a good read, then the lighting sequence for the current distance field starts at the beginning and iterates through each sequence capture-after-capture.

In some embodiments, the exposure and gain module 238 rejects images that do not fall within predefined attribute ranges for "brightness" and/or "sharpness" (e.g., the rejected images are not processed by the image acquisition and processing module 240). In some embodiments, the exposure and gain module 238 updates image acquisition settings (such as exposure and gain) for the next coming image capture in order to provide the optimal "brightness" for image processing.

In some embodiments, after an image is captured (e.g., using the camera 214), the electronic device 100 (e.g., via the application 230) evaluates the quality of an acquired image. For example, the electronic device 100 reads (e.g., determines) a sharpness value, an average light mean value, and/or an average dark mean value of the image, to determine whether to qualify or reject the image. If the results do not meet or exceed predefined target values, the image is rejected and another image is recaptured. If the results meet or exceed the predefined target values, the image is processed (e.g., by the image acquisition and processing module 240).

As an example, in some embodiments, a good quality image is an image sample that has a light mean score between 100-170 (out of the range of 0 to 255), a dark mean score between 20-80 (out of the range of 0 to 255), and a sharpness score above 6000 (out of the range from 0 to about 12,000).

In some embodiments, data collected during the image sampling (e.g., evaluation) is captured and added (e.g., as data 242).

In some embodiments, after qualifying the image, the electronic device 100 (e.g., via the application 230) determines whether to adjust the exposure or gain setting (e.g., using a light mean correction path or a dark mean correction path) for the next image. Should it decide to do so, the electronic device 100 gathers the target light mean and dark mean values for comparison, deploys a Proportional and Integral (PI) Controller transfer function, and computes necessary changes to exposure in order to obtain an ideal exposure in the next image.

In some embodiments, upon successful decode of an image, the exposure, gain, and focus values are fed back to the application 230. On the following read cycle, the application 230 checks if these decode settings are pending. If they are, the electronic device 100 attempts to load camera settings and any previous settings, as opposed to calculating the next configuration of settings. Should the previous decode settings be used, the application 230 samples the image for data but does not adjust the feedback controller's values.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 206 stores a subset of the modules and data structures identified above. Furthermore, the memory 206 may store additional modules or data structures not described above. In some embodiments, a subset of the programs, modules, and/or data stored in the memory 206 are stored on and/or executed by a server system, and/or by an external device (e.g., a computing device).

Figure 3:
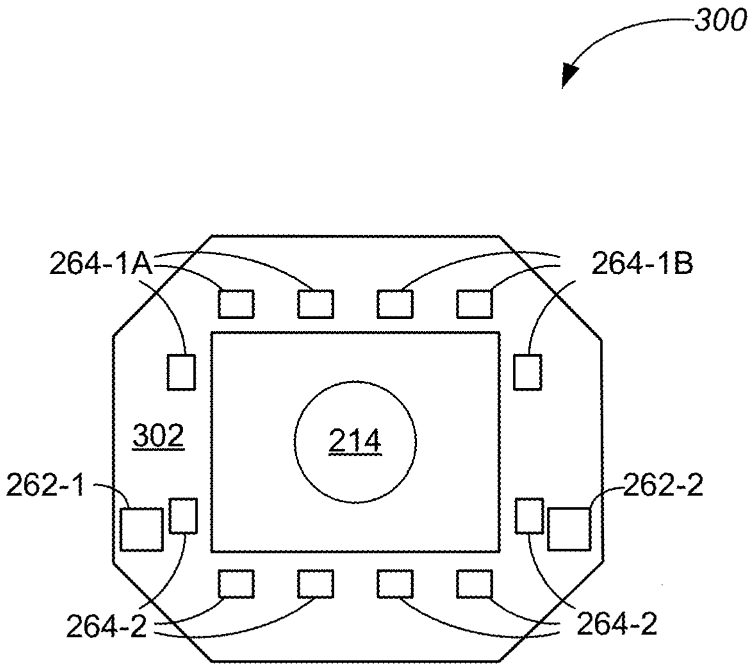
FIG. 3 is a front view of an example printed circuit board (PCB) of an electronic device 100, according to some embodiments.

FIG. 3 is a front view of an example printed circuit board (PCB) 300 of an electronic device 100 according to some embodiments. A plurality of light sources 260 are mounted on the PCB 300. A light source 260 is also called a lighting source, an illumination source, or an illuminator. In some embodiments, the light sources 260 are part of an illumination system of the electronic device 100, which also includes illuminators (e.g., bright field and dark field illuminators), a reflector, and a lighting module. More details on the illumination system are described in U.S. patent application Ser. No. 14/298,659, filed Jun. 6, 2014, entitled "Combination Dark Field and Bright Field Illuminator," now U.S. Pat. No. 8,989,569, issued on Mar. 24, 2015, which is incorporated by reference herein in its entirety.

In some embodiments, the light sources 260 have one or more lighting types. Examples of the lighting types include, but are not limited to, LED light sources, laser light sources, and liquid crystal display (LCD) lights. Each of the lighting types has respective lighting characteristics, such as color (e.g., blue, red, or green) and/or intensity.

Referring to FIG. 3, in some embodiments, the light sources 260 are mounted on (e.g., soldered on) the PCB 300 that is positioned within the electronic device 100 (e.g., behind the front cover 102). The PCB 300 includes a front surface 302 facing the front end of the electronic device 100, and a rear surface (not shown) facing the back end of the electronic device 100. The rear surface of the PCB 300 is opposite to the front surface 302 of the PCB 300. In some embodiments, the light sources mounted on the front surface 302 of the PCB 300 include both long range light sources 262 (e.g., 262-1 and 262-2) and low angle light sources 264 (e.g., 264-1 and 264-2). The low angle light sources 264-1 in FIG. 3 are shown further subdivided into two groups 264-1A and 264-1B. Further, in some embodiments, one or more dome light sources 266 are mounted on the rear surface of the PCB 300.

In some embodiments, the long range light sources 262 are used for illuminating a far field distance range. For example, the far field distance range includes distances such as ≥50 mm, ≥60 mm, 50 mm to 300 mm, or 60 mm to 250 mm. In some embodiments, the electronic device 100 detects activities in the far field distance using the distance sensor 104. In response to detection of the activities in the far field distance, the electronic device 200 selects and powers on at least one of the long range light sources 262. In some embodiments, the long range light sources include a first long range light source 262-1 positioned on the left and a second long range light source 262-2 positioned on the right of the front surface 302 of the PCB 300. In some embodiments, the first long range light source 262-1 and the second long range light source 262-2 have the same lighting type, e.g., both are LED lights having the same color, intensity, and/or lighting characteristics. In some embodiments, the first long range light source 262-1 and the second long range light source 262-2 have different lighting types, while each light source 262 has a respective color and/or intensity. For instance, the first long range light source 262-1 is a blue LED and the second long range light source 262-2 is a red LED. Alternatively, in an example, the first long range light source 262-1 is an LED light and the second long range light source 262-2 is an LCD light.

In some embodiments, the lighting characteristics of the first long range light source 262-1 are adjusted independently of the lighting characteristics of the second long range light source 262-2. In some embodiments, the first long range light source 262-1 and the second long range light source 262-2 have predetermined intensities that are fixed and not adjustable. The intensities are optionally predetermined by hardware or user specification. In some embodiments, the first long range light source 262-1 and the second long range light source 262-2 are controlled jointly and in synchronization with each other. For example, the long range light sources 262-1 and 262-2 are activated or deactivated (e.g., turned on or off) together.

In some embodiments, the light sources 260 include low angle light sources 264. Referring to FIG. 3, in some embodiments, the low angle light sources 264 include first low angle light sources 264-1 that are positioned on the top half of the front surface 302 and second low angle light sources 264-2 that are positioned on the bottom half of the front surface 302. The low angle light sources 264 are also known as dark field illuminators. More details of dark field illuminators are described in U.S. patent application Ser. No. 14/298,659, filed Jun. 6, 2014, entitled "Combination Dark Field and Bright Field Illuminator," now U.S. Pat. No. 8,989,569, which issued on Mar. 24, 2015 and is incorporated by reference herein in its entirety.

In some embodiments, the light source 260 is constantly powered on to illuminate a field of view, e.g., during an extended duration of time that is longer than a threshold duration of time. Alternatively, in some embodiments, the light source 260 is powered on intermittently to illuminate a field of view. For example, the electronic device 100 further includes a camera 214 configured to capture an image of a field of view at a flash rate, while the field of view is illuminated by the light sources 262 and/or 264 for a shortened duration of time associated with the flash rate. The light sources 262 and/or 264 are enabled before the camera captures the image, and disabled after the camera captures the image. In some situations, the flash rate is substantially fast (e.g., greater than a threshold rate) and the light sources 262 and/or 264 have a substantially high brightness level greater than a threshold brightness level, such that the camera 214 can capture high quality images at the substantially fast flash rate.

In some embodiments, the camera 214 includes a camera lens 218, which is exposed via an opening of the PCB 300. In some embodiments, the low angle light sources 264 illuminate the field of view with relatively low angles of incidence (e.g., 10 degrees, 15 degrees, or 30 degrees), and part of light is not reflected back into the lens 218 of the camera 214. The part of light that is scattered by objects in the field of view and reflected into the camera 214 produces a contrast that is consistent with features of the objects. The image captured by the camera 214 thereby reflects the features of the objects in the field of view of the camera 214. In some embodiments, the low angle light sources 264 are used to inspect a mirrored reflective surface for defects or read a barcode beneath a specular reflective surface (such as a plastic cover) that is otherwise unreadable using standard bright field lighting.

In some embodiments not shown, the light sources 260 of the electronic device 100 include dome light sources 266 that are mounted on the PCB rear surface. In some embodiments, the electronic device 100 includes a curved reflector having a curved reflecting surface. Incident light from the dome light sources 266 is directed toward the curved reflector of the electronic device 100, and the light reflected from the reflector is used to illuminate a target object. Details of the reflector are described in U.S. patent application Ser. No. 14/298,659, filed Jun. 6, 2014, entitled "Combination Dark Field and Bright Field Illuminator," now U.S. Pat. No. 8,989,569, which issued on Mar. 24, 2015 and is incorporated by reference herein in its entirety.

In some embodiments, the long range light source 262 has two LEDs, one corresponding to the first long range light source 262-1 and the other corresponding to the second long range light source 262-2. Both the first and second long range light sources are activated or deactivated simultaneously. In some embodiments, the first low angle light sources 264-1 include a plurality of LEDs (e.g., four, six, or eight), all of which are activated or deactivated simultaneously. In some embodiments, the second low angle light sources 264-2 include a plurality of LEDs (e.g., four, six, or eight), all of which are activated or deactivated simultaneously. In some embodiments, the dome light sources 266 include a plurality of LEDs (e.g., six, eight, or ten), all of which are activated or deactivated simultaneously.

In some embodiments, the lens 218 of the camera 214 is exposed via the opening of the PCB 300 and physically surrounded by the light sources 262 and/or 264. The light sources 262 and/or 264 form a plurality of illumination units (e.g., a first illumination unit a second illumination unit). Each illumination unit is configured to be independently controlled to illuminate a distinct region of the field of view of the camera 214. In an example, six first low angle light sources 264-1 are grouped to form the first illumination unit, and six second low angle light sources 264-2 are grouped to form the second illumination unit. The first illumination unit is enabled sequentially or concurrently with the second illumination unit, and two halves of the field of view of the camera 214 are illuminated in a sequential or concurrent manner. In another example, the first low angle light sources 264-1 are split into the first illumination unit including a first set of three light sources 264-1A and the second illumination unit including a second set of three light sources 264-1B. The first illumination unit is enabled sequentially or concurrently with the second illumination unit, and two quarters of the field of view of the camera 214 are illuminated in a sequential or concurrent manner. In some embodiments, the long range light sources 262-1 and 262-2 are enabled sequentially or concurrently to illuminate the entire field of view of the camera 214 in a sequential or concurrent manner.

FIG. 3 is a front view of an example printed circuit board (PCB) 300 of an electronic device 100 according to some embodiments. A plurality of light sources 260 are mounted on the PCB 300. Light sources 260 are also called lighting sources, illumination sources, or illuminators. In some embodiments, the light sources 260 are part of an illumination system of the electronic device 100, which also includes illuminators (e.g., bright field and dark field illuminators), a reflector, and a lighting module. More details on the illumination system are described in U.S. patent application Ser. No. 14/298,659, filed Jun. 6, 2014, entitled "Combination Dark Field and Bright Field Illuminator," now U.S. Pat. No. 8,989,569, issued on Mar. 24, 2015, which is incorporated by reference herein in its entirety.

In some embodiments, the light sources 260 have one or more lighting types. Examples of the lighting types include, but are not limited to, LED light sources, laser light sources, and liquid crystal display (LCD) lights. Each of the lighting types has respective lighting characteristics, such as color (e.g., blue, red, or green) and/or intensity.

Figure 4:
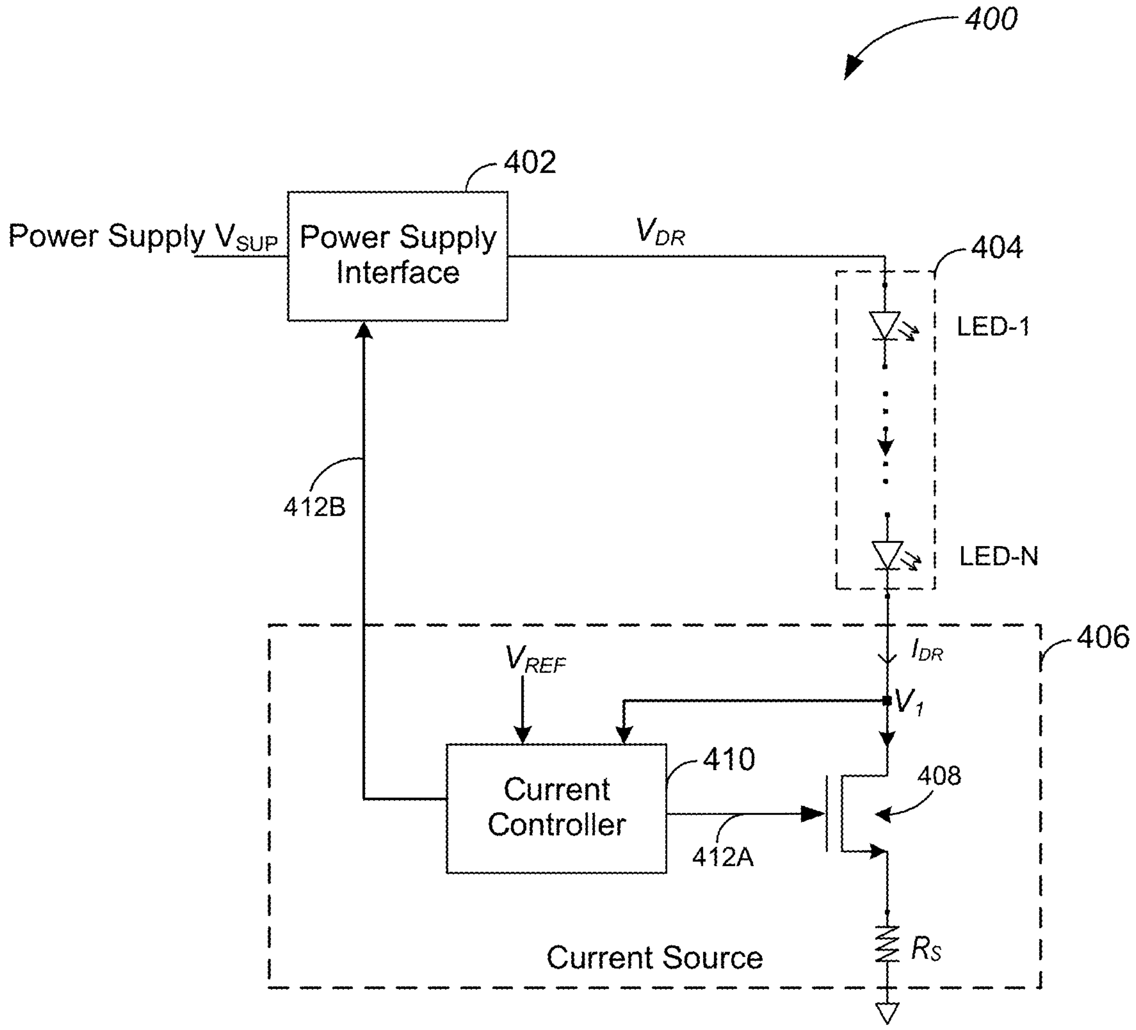
FIG. 4 is a block diagram of an example LED operation system, in accordance with some embodiments.

FIG. 4 is a block diagram of an example LED operation system 400, in accordance with some embodiments. The LED operation system 400 includes a power supply interface 402, a light emitting diode (LED) module 404, and a current source 406. The power supply interface 402 is configured to receive a power supply $V_{SUP}$ and generate a configurable drive voltage $V_{DR}$. The LED module 404 is coupled to the power supply interface 402, and configured to be driven by the configurable drive voltage $V_{DR}$. The current source 406 is coupled to the power supply interface 402 via the LED module 404, and configured to stabilize the drive current $I_{DR}$ of the LED module 404 dynamically at a target drive current $I_T$ and hold the illumination efficiency $\eta$ of the LED operation system 400 above a target efficiency level $\eta_T$. In some embodiments, the LED module 404 includes a plurality of LEDs coupled in series to form an LED string. In some embodiments, the LED module 404 includes a single LED. In some embodiments, each LED of the LED module 404 is applied as one of the light sources 260 (e.g., a long range light source 262, a low angle light source 264, or a doom light source 266) of a barcode scanner as shown in FIG. 1, and the LED operation system 400 is configured to drive a subset of light sources 260 of the barcode scanner. In an example, the LED module 404 includes a set of three low angle light sources 264 coupled in series in an LED string. In another example, the LED module 404 includes a long range light source 262 and six low angle light sources 264, which are coupled in series to form an LED string.

In some embodiments, the current source 406 further includes a drive transistor 408 and a current controller 410. The drive transistor 408 is coupled in series with the LED module 404, and is configured to control the drive current $I_{DR}$ of the LED module 404. The current controller 410 is coupled to the drive transistor 408, and configured to (i) monitor the first voltage $V_1$ of the drive transistor 408 with reference to the reference voltage $V_{REF}$ and (ii) generate a control signal 412 for adjusting the drive current $I_{DR}$ dynamically based on deviation of the first voltage $V_1$ from the reference voltage $V_{REF}$. In some embodiments, the control signal 412 includes a first control signal 412A, and the first control signal 412A is applied at the gate of the drive transistor 408 to adjust the drive current $I_{DR}$, which passes both the LED module 404 and the drive transistor 408. The control signal 412 compensates for the deviation of the first voltage $V_1$ from the reference voltage $V_{REF}$. Referring to FIG. 4, in some embodiments, the drive transistor is an N-type metal-oxide-semiconductor field-effect transistor (MOSFET). Alternatively, in some embodiments not shown, the drive transistor 408 is a P-type MOSFET.

In some embodiments, the control signal 412 includes a second control signal 412B. The second control signal 412B is applied to the power supply interface 402 to adjust the configurable drive voltage $V_{DR}$, thereby adjusting the drive current $I_{DR}$ of the LED module 404 and compensating for the deviation of the first voltage $V_1$ from the reference voltage $V_{REF}$. In some situations, the first and second control signals 412A and 412B are used jointly to stabilize the drive current $I_{DR}$ of the LED module 404 at the target drive current $I_{DR}$.

Further, in some embodiments, the reference voltage $V_{REF}$ is predefined based on the saturation voltage $V_{SAT,T}$ of the drive transistor 408 associated with the target drive current $I_T$. The first control signal 412A applied at the gate of the drive transistor 408 is greater than the threshold voltage $V_{TH}$ of the drive transistor 408. In some embodiments, the saturation voltage $V_{SAT}$ of the drive transistor 408 is broadly defined as the difference between the gate-to-source voltage $V_{GS}$ of the drive transistor 408 and the threshold $V_{TH}$ of the drive transistor 408 (i.e., $V_{GS}-V_{TH}$, at the corresponding drive current $I_{DR}$). More details on the reference voltage $V_{REF}$ and the saturation voltage $V_{SAT}$ are explained below with reference to FIGS. 5A-5C. Additionally, in some embodiments, the current source 406 further includes a current sense resistor $R_S$ coupled to a source of the drive transistor 408, and the reference voltage $V_{REF}$ includes a voltage drop on the current sense resistor $R_S$ determined based on the target drive current $I_T$.

Figure 5A:
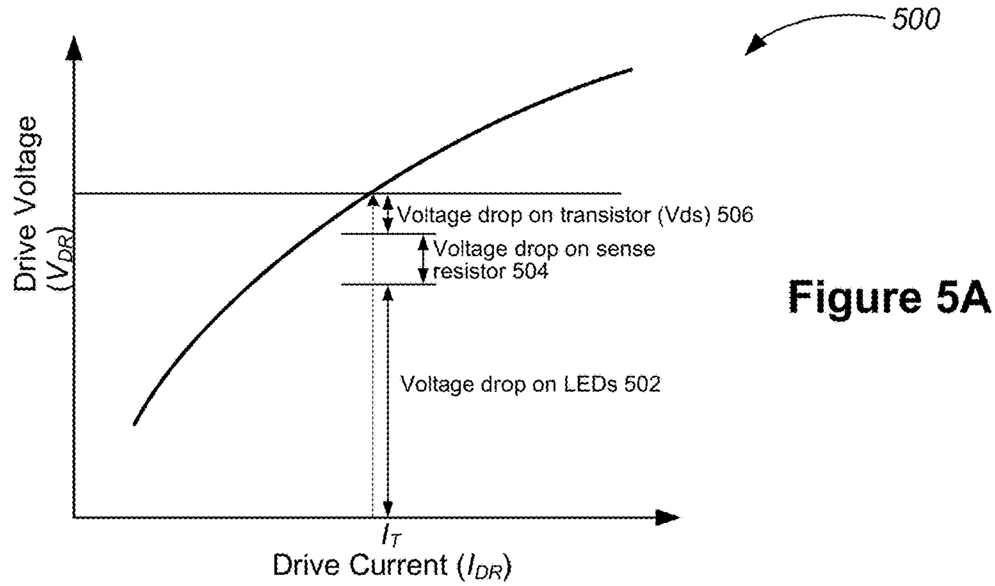
FIG. 5A is a diagram illustrating an example relationship of the drive voltage and the drive current of an LED operation system, in accordance with some embodiments.
Figure 5B:
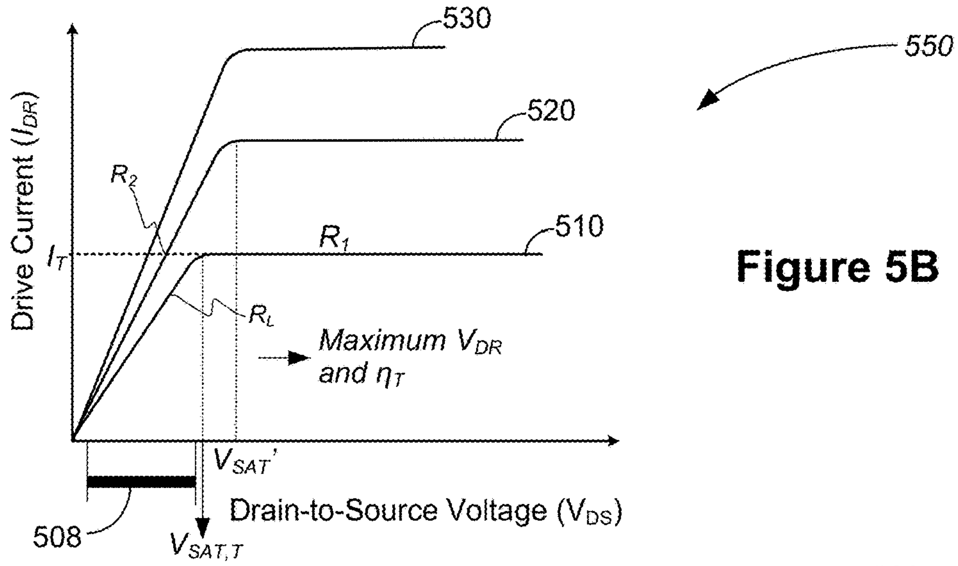
FIG. 5B is a diagram illustrating example curves of the drive current and the drain-to-source voltage drop of a drive transistor under different circumstances, in accordance with some embodiments.
Figure 5C:
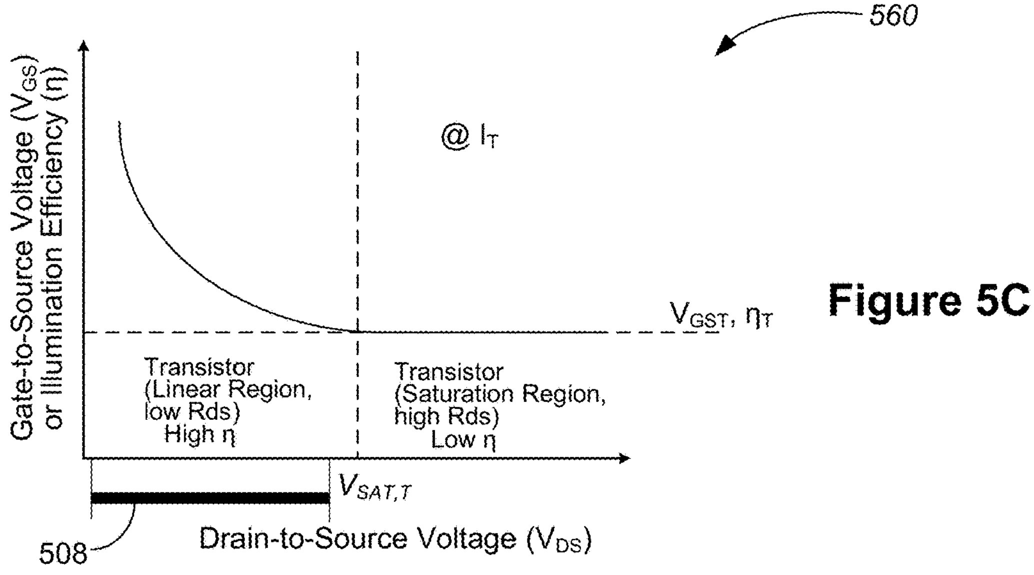
FIG. 5C is a diagram illustrating an example relationship of the gate-to-source voltage and the drain-to-source voltage of a drive transistor that is driven by a target drive current, in accordance with some embodiments.

FIG. 5A is a diagram illustrating an example relationship 500 of the drive voltage $V_{DR}$ and the drive current $I_{DR}$ of an LED operation system 400, in accordance with some embodiments. FIG. 5B is a diagram illustrating example curves 550 of drive current $I_{DR}$ and drain-to-source voltage drop $V_{DS}$ of a drive transistor 408 under different circumstances, in accordance with some embodiments. FIG. 5C is a diagram illustrating an example relationship 560 of gate-to-source $V_{GS}$ voltage and drain-to-source voltage $V_{DS}$ of the drive transistor 408 that is driven by a target drive current $I_T$, in accordance with some embodiments. The illumination efficiency n of the corresponding LED operation system 400 follows a trend of the relationship 560.

Each node of the relationship 500 corresponds to a target drive current $I_T$ and a target drive voltage $V_T$. The LED operation system 400 includes a power supply interface 402, an LED module 404, and a current source 406. The current source 406 is coupled to the power supply interface 402 via the LED module 404, and configured to stabilize the drive current $I_{DR}$ of the LED module 404 dynamically at the target drive current $I_T$. Referring to FIG. 5A, each LED of the LED module 404 requires an LED voltage to generate the target drive current $I_T$, and the LED module 404 corresponds to an LED module voltage 502. In some embodiments, the current source 406 further includes a current sense resistor $R_S$ coupled to a source of the drive transistor 408, and the current sense resistor $R_S$ corresponds to a resistive voltage drop 504. The transistor voltage drop 506 on the drive transistor 408 is measured between the drain and the source of the drive transistor 408. The configurable drive voltage $V_{DR}$ is the sum of the LED module voltage 502, the resistive voltage drop 504, and the transistor voltage drop 506. In some situations, when the drive current $I_{DR}$ is substantially stabilized at the target drive current $I_T$, both the LED module voltage 502 and the resistive voltage drop 504 are substantially stable.

Referring to FIG. 5B, in some embodiments, the drive transistor 408 has a first gate voltage, allowing the drive transistor 408 to operate in the saturation region in which the drive current $I_{DR}$ saturates at the target drive current $I_T$ in accordance with a first curve 510. The transistor voltage drop 506 is greater than a saturation voltage $V_{SAT,T}$ of the drive transistor 408, and the drive current $I_{DR}$ does not vary with the transistor voltage drop 506 before the transistor voltage drop 506 drops below the saturation voltage $V_{SAT}$. Stated another way, the configurable drive voltage $V_{DR}$ is allowed to vary above the sum of the LED module voltage 502, the resistive voltage drop 504, and the saturation voltage $V_{SAT,T}$ of the drive transistor 408 without impacting the stability of the drive current $I_{DR}$ of the LED module 404. Alternatively, in some embodiments, the drive transistor 408 has a second gate voltage, allowing the drive transistor 408 to operate in the linear region or the triode region in which the drive current $I_{DR}$ is set to the target drive current $I_T$ while the drive transistor 408 is not saturated in accordance with a second curve 520. The drive current $I_{DR}$ varies with the transistor voltage drop 506, until the transistor voltage drop 506 increases beyond the saturation voltage $V_{SAT}'$ of the drive transistor 408, which varies with the second gate voltage of the drive transistor 408. The configurable drive voltage $V_{DR}$ is held substantially stable to avoid impacting the stability of the drive current $I_{DR}$ of the LED module 404.

In the saturation region of the first curve 510, the drive current $I_{DR}$ is substantially stable with reference to the transistor voltage drop 506, and the drive transistor 408 has a first equivalent resistance $R_1$, which is greater than a linear equivalent resistance $R_L$ of the linear region of the first curve 510. In the linear or triode region of the second curve 520, the drive current $I_{DR}$ varies with the transistor voltage drop 506, and the drive transistor 408 has a second equivalent resistance $R_2$. The first equivalent resistance $R_1$ is substantially greater than the linear equivalent resistance $R_L$, which is greater than the second equivalent resistance $R_2$. The first equivalent resistance $R_1$ consumes more power as the drive current $I_{DR}$ is stabilized at the target drive current $I_T$. Given that both the LED module voltage 502 and the resistive voltage drop 504 are substantially stable, the drive transistor 408 operating in the saturation region of the first curve 510 consumes more power and has a smaller efficiency η than the drive transistor 408 operating in the linear or triode region of the second curve 520. The saturation voltage $V_{SAT,T}$ of the first curve 510 is less than that of the second curve 520. The first gate voltage is less than the second gate voltage. The transistor voltage drop 506 of the drive transistor 408 operating in the saturation region of the first curve 510 is higher than that of the drive transistor 408 operating in the linear or triode region of the second curve 520.

Stated another way, in some embodiments, the current source 406 controls the drive transistor 408 to operate in the linear region while stabilizing the drive current of the LED module at the target drive current $I_T$. When the drive transistor 408 operates in the linear region to enable the target drive current $I_T$, the configurable drive voltage $V_{DR}$ is determined to push the drive transistor 408 to operate in the linear region while the drive current $I_{DR}$ of the LED module 404 is stabilized at the target drive current $I_T$. More specifically, referring to FIG. 5C, the gate-to-source voltage $V_{GS}$ is greater than the threshold voltage $V_{TH}$ of the drive transistor 408 and greater than the target transistor voltage $V_{GST}$, which is set by the target drive current $I_{DR}$. In an example, the target transistor voltage $V_{GST}$ is equal to the sum of the threshold voltage $V_{TH}$ and the saturation voltage $V_{SAT,T}$ corresponding to the target drive current $I_{DR}$. In some embodiments, the configurable drive voltage $V_{DR}$ is in a range 508. An upper limit of the range 508 is less than the sum of the LED module voltage 502, the resistive voltage drop 504, and the saturation voltage $V_{SAT,T}$ corresponding to the target drive current $I_{DR}$, such that the drive transistor 408 is controlled to operate in the linear or triode region. By these means, the gate voltage of the drive transistor 408 (i.e., the first control signal 412A) is controlled jointly with the configurable drive voltage $V_{DR}$ to enable the target drive current $I_{DR}$.

When the illumination efficiency of the LED operation system 400 exceeds the target efficiency level $\eta_T$, the drive transistor 408 operates in the linear or triode region (e.g., in the second curve 520). The lower the configurable drive voltage $V_{DR}$, the higher the illumination efficiency of the LED operation system 400. For example, a third curve 530 corresponds to a lower configurable drive voltage $V_{DR}$, a higher gate-to-source voltage $V_{GS}$ (i.e., first control signal 412A), and a higher illumination efficiency than the second curve 520. Additionally, in some embodiments, the target efficiency level $\eta_T$ of the LED operation system 400 is determined based on at least the saturation voltage $V_{SAT,T}$ corresponding to the target drive current $I_{DR}$. When the target efficiency level $\eta_T$ is reached, the gate voltage of the drive transistor 408 (i.e., the first control signal 412A) is substantially equal to the sum of the saturation voltage $V_{SAT,T}$ and the threshold voltage $V_{TH}$, and the configurable drive voltage $V_{DR}$ is equal to the sum of the LED module voltage 502, the resistive voltage drop 504, and the saturation voltage $V_{SAT,T}$ corresponding to the target drive current $I_{DR}$. Further, in some embodiments, the target efficiency level $\eta_T$ of the LED operation system 400 is determined based on another curve between the first and second curves 510 and 520 (e.g., based on at least the saturation voltage $V_{SAT}$ greater than the saturation voltage $V_{SAT,T}$ corresponding to the target drive current $I_{DR}$).

Figure 6:
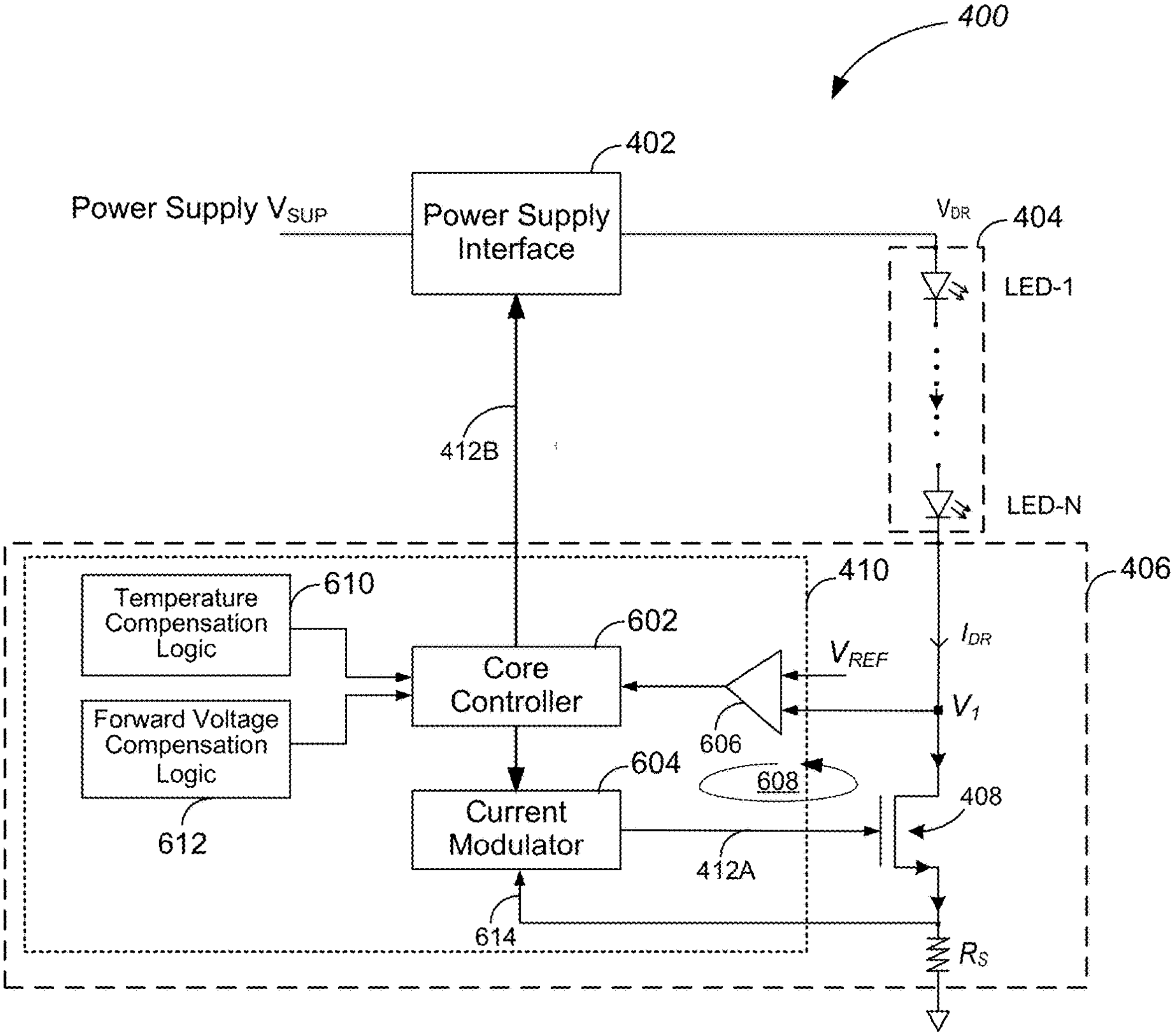
FIG. 6 is a block diagram of another example LED operation system, in accordance with some embodiments.

FIG. 6 is a block diagram of another example LED operation system 400, in accordance with some embodiments. The LED operation system 400 includes a power supply interface 402, a light emitting diode (LED) module 404, and a current source 406. The power supply interface 402 is configured to provide a configurable drive voltage $V_{DR}$. The LED module 404 is coupled to the power supply interface 402, and configured to be driven by the configurable drive voltage $V_{DR}$. The current source 406 is coupled to the power supply interface 402 via the LED module 404, and configured to stabilize a drive current $I_{DR}$ of the LED module 404 dynamically at a target drive current $I_T$ and hold the illumination efficiency $\eta$ of the LED operation system 400 above the target efficiency level $\eta_T$. In some embodiments, a drive transistor 408 is coupled in series with the LED module 404 and configured to control the drive current $I_{DR}$ of the LED module 404.

In some embodiments, the target efficiency level $\eta_T$ corresponds to a condition in which the configurable drive voltage $V_{DR}$ is controlled to make the voltage drop across the drive transistor 408 equal to or less than the saturation voltage $V_{SAT,T}$ at the target drive current $I_T$. In some embodiments, a current controller 410 of the current source 406 receives a first voltage $V_1$ at the drain of the drive transistor 408 to form feedback to control the drive transistor 408 to operate in the linear or triode region. The gate-to-source voltage $V_{GS}$ of the drive transistor 408 is controlled to exceed the sum of the threshold voltage $V_{TH}$ and the saturation voltage $V_{SAT,T}$ at the target drive current $I_T$, such that the drive transistor 408 can operate in the linear or triode region. In some embodiments, the configurable drive voltage $V_{DR}$ is automatically set based on the gate-to-source voltage $V_{GS}$ of the drive transistor 408, thereby allowing the drive transistor 408 to generate the target drive current $I_T$ in the linear or triode region. As explained with reference to FIG. 5B, the configurable drive voltage $V_{DR}$ corresponds to a range 508 of the voltage drop of the drive transistor 408 operating in the linear region.

In some embodiments, a current controller 410 is coupled to the drive transistor 408. The current controller 410 generates a second drive voltage control signal 412B to control sweeping of the configurable drive voltage $V_{DR}$ within a drive voltage range, monitor the first voltage $V_1$ of the drive transistor 408 with reference to a reference voltage $V_{REF}$ during sweeping of the configurable drive voltage $V_{DR}$, and determine the configurable drive voltage $V_{DR}$ based on a comparison result of the first voltage $V_1$ and the reference voltage $V_{REF}$. Further, in some embodiments, the current source 406 further includes a current sense resistor $R_S$ coupled to a source of the drive transistor 408. The reference voltage $V_{REF}$ is predefined based on (i) the voltage drop 504 on the current sense resistor $R_S$ and (ii) the saturation voltage $V_{SAT,T}$ of the drive transistor 408. Both the voltage drop and the saturation voltage $V_{SAT,T}$ are predefined based on the target drive current $I_T$. In some embodiments, the reference voltage $V_{REF}$ is calibrated in the factory before the electronic device 100 is shipped. The voltage drop 504 is monitored at a terminal 614 of the current sense resistor $R_S$ in the factory. By these means, the reference voltage $V_{REF}$ is defined according to the target drive current $I_T$, and used to select the configurable drive voltage $V_{DR}$ and generate the first control signal 412A for stabilizing the drive current $I_{DR}$ at the target drive current $I_T$.

In some embodiments, the current controller 410 includes one or more of: a core controller 602, a current modulator 604, and a comparator 606. The comparator 606 compares the reference voltage $V_{REF}$ and the first voltage $V_1$. In some embodiments, the configurable drive voltage $V_{DR}$ increases from a low voltage (e.g., 0), such that the reference voltage $V_{REF}$ is greater than the first voltage $V_1$ initially at a start of a sweep. In accordance with a determination that the reference voltage $V_{REF}$ is equal to or less than the first voltage $V_1$, the configurable drive voltages $V_{DR}$ is determined and selected to drive the LED operation system 400. Alternatively, in some embodiments, the configurable drive voltage $V_{DR}$ decreases from a high voltage (e.g., a high supply voltage $V_{DD}$), such that the reference voltage $V_{REF}$ is lower than the first voltage $V_1$ initially at a start of a sweep. In accordance with a determination that the reference voltage $V_{REF}$ is equal to or greater than the first voltage $V_1$, the configurable drive voltages $V_{DR}$ is determined and selected to drive the LED operation system 400. During the course of determining the configurable drive voltage $V_{DR}$, each sweep point of the configurable drive voltage $V_{DR}$ is given an extended duration of time, and a closed loop 608 is applied to automatically control the gate voltage (i.e., the first control signal 412A) of the drive transistor 408. After the configurable drive voltage $V_{DR}$ is determined for the target drive current $I_T$, the closed loop 608 dynamically stabilizes the target drive current $I_T$ by providing feedback to the core controller 602, such that the core controller 602 can control the drive transistor 408 to adjust the drive current $I_{DR}$.

In some embodiments, the current controller 410 further includes temperature compensation logic 610 coupled to the core controller 602. The core controller 602 is configured to set the configurable drive voltage $V_{DR}$ in accordance with a determination that the temperature deviation from a predefined temperature exceeds a threshold temperature drift. For example, if the temperature is 75° C., which is 50° C. above the nominal temperature, the compensation logic 610 determines the temperature deviation, and triggers the core controller 602 to adjust the configurable drive voltage $V_{DR}$. Alternatively, in some embodiments, the current controller

410 further includes forward voltage compensation logic 612 coupled to the core controller 602. The forward voltage compensation logic 612 is configured to determine the forward voltage deviation between the voltage drop on the LED module 404 and a predefined forward voltage of the LED module 404, and the core controller 602 is configured to set the configurable drive voltage $V_{DR}$ in accordance with a determination that the forward voltage deviation exceeds a threshold forward deviation.

In some embodiments, the configurable drive voltage $V_{DR}$ is automatically set in response to user instructions received on a user interface of a software application configured to control the LED module 404. For example, a user enters the target drive current $I_T$ on the user interface. The target drive current $I_T$ corresponds to a target brightness level of the LED module 404. In another example, a user enters the target brightness level to set the target drive current $I_T$. The target drive current $I_T$ is optionally any value in an allowable drive current range. Alternatively, in some embodiments, the configurable drive voltage $V_{DR}$ is automatically set in response to user selection of the target drive current $I_T$ among a plurality of predefined drive currents. Additionally, in some embodiments, the plurality of predefined drive currents includes a low drive current, an intermediate drive current greater than the low drive current, and a high drive current greater than the intermediate drive current.

In some embodiments, the power supply interface 402 includes a switched mode converter coupled to a DC power supply. The DC power supply is configured to provide a DC supply voltage $V_{DD}$ (e.g., 12V) to the switched mode converter. The switched mode converter of the power supply interface 402 is configured to generate the configurable drive voltage $V_{DR}$. The switched mode converter is controlled by the core controller 602 to adjust the configurable drive voltage $V_{DR}$. Further, in some embodiments, the configurable drive voltage $V_{DR}$ is lower than the DC supply voltage $V_{DD}$. Alternatively, in some embodiments, the configurable drive voltage $V_{DR}$ is higher than the DC supply voltage $V_{DD}$.

In some embodiments, a state machine is applied to enable and calibrate a single sweep point of the configurable drive voltage $V_{DR}$. In accordance with the state machine, the configurable drive voltage $V_{DR}$ is set to a low voltage that is lower than the drive voltage floor under which the LED module 404 will not function or the drive transistor 408 operates in its cutoff region. The current modulator 604 is set to a drive target point that needs to be calibrated. The core controller 602 monitors the voltage comparator 606 for a voltage event (e.g., when the first voltage $V_1$ increases above the reference voltage $V_{REF}$). The core controller 602 sweeps the configurable drive voltage $V_{DR}$ upwards slowly to look for the voltage event. In response to detection of the voltage event, the core controller 602 determines the correct configurable drive voltage setting for the target drive current $I_T$. In some embodiments, the core controller 602 drops the configurable drive voltage back to or below the drive voltage floor to begin another calibration step or exit if done with calibration points.

Figure 7:
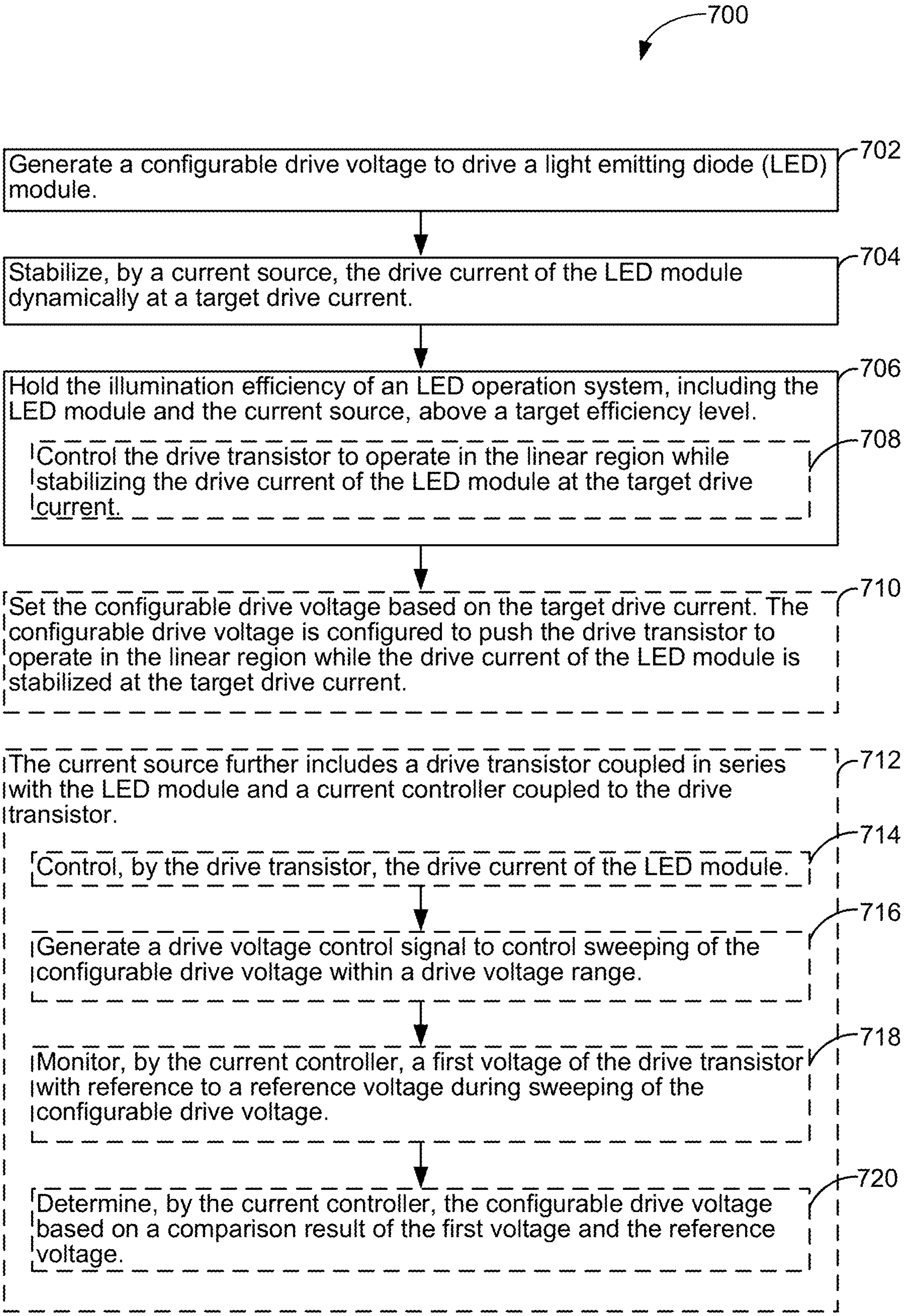
FIG. 7 is a flow diagram of a method for providing efficient LED operation, in accordance with some embodiments.

FIG. 7 is a flow diagram of a method 700 for providing efficient LED operation, in accordance with some embodiments. The method 700 is implemented by an electronic device 100 (e.g., a barcode scanner) including an LED module 404. In some embodiments, the LED module 404 includes a single LED. In some embodiments, the LED module 404 includes a plurality of LEDs coupled in series to form an LED string. In some embodiments, each LED is a long range light source 262, a low angle light source 264, or a dome light source 266. The electronic device generates (702) a configurable drive voltage $V_{DR}$ to drive the LED module 404, stabilizes (704) the drive current $I_{DR}$ of the LED module 404 dynamically at a target drive current $I_T$, and holds (706) the illumination efficiency of the LED operation system 400) (including the LED module 404 and the current source 406) above a target efficiency level $\eta_T$.

In some embodiments, the current source 406 includes a drive transistor 408 that is coupled in series with the LED module 404. The electronic device holds the illumination efficiency of the LED operation system 400 above the target efficiency level $\eta_T$ by controlling (708) the drive transistor 408 to operate in the linear region while stabilizing the drive current $I_{DR}$ of the LED module 404 at the target drive current $I_T$. As the drive transistor 408 is controlled to operate in the linear region, the efficiency of the LED operation system 400 is kept at a substantially maximum efficiency level associated with the target drive current $I_T$ (i.e., above the target efficiency level $\eta_T$).

In some embodiments, the configurable drive voltage $V_{DR}$ is set (710) based on the target drive current $I_T$. The configurable drive voltage $V_{DR}$ is configured to push the drive transistor 408 to operate in the linear region while the drive current $I_{DR}$ of the LED module 404 is stabilized at the target drive current $I_T$. Operating in the linear region, the drive transistor 408 has substantially low equivalent resistance compared with the high equivalent resistance associated with the saturation region, and therefore has a low voltage drop and a low power consumption while the drive current $I_{DR}$ of the LED module 404 is kept at the target drive current $I_T$. By these means, the configurable drive voltage $V_{DR}$ is set at a minimal voltage level that can still keep the target drive current $I_T$, thereby providing the highest efficiency level for the LED operation system 400.

Further, in some embodiments, the current source 406 includes (712) a drive transistor 408 coupled in series with the LED module 404 and a current controller 410 coupled to the drive transistor 408. The drive transistor 408 controls (714) the drive current $I_{DR}$ of the LED module 404. The current controller 410 generates (716) a drive voltage control signal to control sweeping of the configurable drive voltage $V_{DR}$ within a drive voltage range, monitors (718) a first voltage $V_1$ of the drive transistor 408 with reference to a reference voltage $V_{REF}$ during sweeping of the configurable drive voltage $V_{DR}$, and determines (720) the configurable drive voltage $V_{DR}$ based on a comparison result of the first voltage $V_1$ and the reference voltage $V_{REF}$. Additionally, in some embodiments, the current source 406 further includes a current sense resistor $R_S$ coupled to a source of the drive transistor 408. The electronic device 100 provides the reference voltage $V_{REF}$ predefined based on a voltage drop on the current sense resistor $R_S$ and the saturation voltage of the drive transistor 408. Both the voltage drop and the saturation voltage are predefined based on the target drive current $I_T$.

In some embodiments, the configurable drive voltage $V_{DR}$ is set in accordance with a determination that the temperature deviation from a predefined temperature exceeds a threshold temperature drift. In some embodiments, a current controller 410 of the electronic device 100 determines the forward voltage deviation between the voltage drop on the LED module 404 and a predefined forward voltage of the LED module 404. The configurable drive voltage $V_{DR}$ is set in accordance with a determination that the forward voltage deviation exceeds a threshold forward deviation.

In some embodiments, the configurable drive voltage $V_{DR}$ is automatically set in response to user instructions received on a user interface of a software application configured to control the LED module 404. In an example, the user instructions include the target drive current $I_T$ in a predefined current range. In some embodiments, the configurable drive voltage $V_{DR}$ is automatically set in response to user selection of the target drive current $I_T$ among a plurality of predefined drive currents. Further, in some embodiments, the plurality of predefined drive currents includes a low drive current, an intermediate drive current greater than the low drive current, and a high drive current greater than the intermediate drive current.

In some embodiments, the current source 406 stabilizes the drive current $I_{DR}$, and further includes a drive transistor 408 coupled in series with the LED module 404 and a current controller 410 coupled to the drive transistor 408. The drive transistor 408 controls the drive current $I_{DR}$ of the LED module 404. The current controller 410 monitors the first voltage $V_1$ of the drive transistor 408 with reference to a reference voltage $V_{REF}$ and generates a control signal for adjusting the drive current $I_{DR}$ dynamically based on deviation of the first voltage $V_1$ from the reference voltage $V_{REF}$. Further, in some embodiments, the current controller 410 adjusts the gate voltage of the drive transistor 408 based on the control signal, thereby adjusting the drive current $I_{DR}$ of the LED module 404 and compensating for the deviation of the first voltage $V_1$ from the reference voltage $V_{REF}$. Alternatively, in some embodiments, the current controller 410 adjusts the configurable drive voltage $V_{DR}$ based on the control signal, thereby adjusting the drive current $I_{DR}$ of the LED module 404 and compensating for the deviation of the first voltage $V_1$ from the reference voltage $V_{REF}$. In some situations, the configurable drive voltage $V_{DR}$ is adjusted in accordance with a determination that adjusting the gate voltage cannot stabilize the drive current $I_{DR}$. In some embodiments, the current controller 410 obtains the reference voltage $V_{REF}$ predefined based on the saturation voltage of the drive transistor 408 associated with the target drive current $I_T$. In some embodiments, the current source 406 further includes a current sense resistor $R_S$ coupled to a source of the drive transistor 408, and the reference voltage $V_{REF}$ includes the voltage drop on the current sense resistor determined based on the target drive current $I_T$.

In some embodiments, the configurable drive voltage $V_{DR}$ is generated by a switched mode converter. The switched mode converter is driven by a DC power supply providing a DC supply voltage. In an example, the configurable drive voltage $V_{DR}$ is lower than the DC supply voltage. In another example, the configurable drive voltage $V_{DR}$ is higher than the DC supply voltage.

In some embodiments, the LED module 404 is constantly powered on to illuminate a field of view, e.g., an extended duration of time that is longer than a threshold duration of time (e.g., 1 minute). Alternatively, in some embodiments, the LED module 404 is powered on intermittently to illuminate a field of view. For example, a camera captures an image of a field of view at a flash rate while the field of view is illuminated by the LED module 404 with the target drive current $I_T$ for a shortened duration of time associated with the flash rate. The flash rate is greater than a threshold rate. In some embodiments, a plurality of illumination units includes a first illumination unit, and the first illumination unit includes the LED module 404 and the current source 406. For each additional illumination unit distinct from the first illumination unit, the configurable drive voltage $V_{DR}$ of the additional illumination unit is set to stabilize the drive current of an LED module 404 at the target drive current $I_T$ of the additional illumination unit, independently of the first illumination unit. Further, in some embodiments, the illumination units are physically arranged to surround a camera lens. The electronic device 100 independently controls each of the plurality of illumination units to illuminate a distinct region of a field of view based on the same target drive current $I_T$, and enables the first illumination unit and a second illumination unit sequentially or concurrently.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 206 stores a subset of the modules and data structures identified above. Furthermore, the memory 206 may store additional modules or data structures not described above.

In another aspect, this application is directed to providing an electronic device 100. The method includes providing a power supply interface 402 configured to provide a configurable drive voltage $V_{DR}$, providing an LED module 404 coupled to the power supply interface 402, and providing a current source 406 coupled to the power supply interface 402 via the LED module 404. The LED module 404 is configured to be driven by the configurable drive voltage $V_{DR}$. The current source 406 is configured to stabilize the drive current of the LED module 404 dynamically at a target drive current $I_T$ and hold the illumination efficiency of an LED operation system 400 above a target efficiency level $\eta_T$. The LED operation system 400 includes the LED module 404 and the current source 406.

Turning now to some example embodiments in the following clauses:

Clause 1. An electronic device, comprising: a power supply interface configured to provide a configurable drive voltage; a light emitting diode (LED) module coupled to the power supply interface, wherein the LED module is configured to be driven by the configurable drive voltage; and a current source coupled to the power supply interface via the LED module, wherein the current source is configured to stabilize a drive current of the LED module dynamically at a target drive current and hold an illumination efficiency of an LED operation system above a target efficiency level, the LED operation system including the LED module and the current source.

Clause 2. The electronic device of clause 1, wherein the current source includes a drive transistor that is coupled in series with the LED module, and the current source is configured to hold the illumination efficiency of the LED operation system above the target efficiency level by controlling the drive transistor to operate in a linear region while stabilizing the drive current of the LED module at the target drive current.

Clause 3. The electronic device of clause 2, wherein the current source is configured to: set the configurable drive voltage based on the target drive current, wherein the configurable drive voltage is configured to push the drive transistor to operate in a linear region while the drive current of the LED module is stabilized at the target drive current.

Clause 4. The electronic device of any of clauses 1-3, wherein the current source further comprises: a drive transistor coupled in series with the LED module, the drive transistor configured to control the drive current of the LED module; and a current controller coupled to the drive transistor, the current controller configured to: generate a drive voltage control signal to control sweeping of the configurable drive voltage within a drive voltage range; monitor a first voltage of the drive transistor with reference to a reference voltage during sweeping of the configurable drive voltage; and determine the configurable drive voltage based on a comparison result of the first voltage and the reference voltage.

Clause 5. The electronic device of clause 4, wherein the current source further includes a current sense resistor coupled to a source of the drive transistor, and the reference voltage is predefined based on (i) a voltage drop on the current sense resistor and (ii) a saturation voltage of the drive transistor, both the voltage drop and the saturation voltage being predefined based on the target drive current.

Clause 6. The electronic device of any of clauses 3-5, wherein the configurable drive voltage is set in accordance with a determination that a temperature deviation from a predefined temperature exceeds a threshold temperature drift.

Clause 7. The electronic device of any of clauses 3-6, wherein the current controller is configured to determine a forward voltage deviation between a voltage drop on the LED module and a predefined forward voltage of the LED module, and the configurable drive voltage is set in accordance with a determination that the forward voltage deviation exceeds a threshold forward deviation.

Clause 8. The electronic device of any of clauses 3-7, wherein the configurable drive voltage is automatically set in response to user instruction received on a user interface of a software application configured to control the LED module.

Clause 9. The electronic device of any of clauses 3-7, wherein the configurable drive voltage is automatically set in response to user selection of the target drive current among a plurality of predefined drive currents.

Clause 10. The electronic device of clause 9, wherein the plurality of predefined drive currents includes a low drive current, an intermediate drive current greater than the low drive current, and a high drive current greater than the intermediate drive current.

Clause 11. The electronic device of any of clauses 1-10, wherein the current source further includes: a drive transistor coupled in series with the LED module, the drive transistor configured to control the drive current of the LED module; and a current controller coupled to the drive transistor, the current controller configured to (i) monitor a first voltage of the drive transistor with reference to a reference voltage and (ii) generate a control signal for adjusting the drive current dynamically based on a deviation of the first voltage from the reference voltage.

Clause 12. The electronic device of clause 11, wherein the control signal is configured to adjust a gate voltage of the drive transistor, thereby adjusting the drive current of the LED module and compensating for the deviation of the first voltage from the reference voltage.

Clause 13. The electronic device of clause 11 or 12, wherein the control signal is configured to adjust the configurable drive voltage, thereby adjusting the drive current of the LED module and compensating for the deviation of the first voltage from the reference voltage.

Clause 14. The electronic device of any of clauses 11-13, wherein the reference voltage is predefined based on a saturation voltage of the drive transistor associated with the target drive current.

Clause 15. The electronic device of any of clauses 11-14, wherein the current source further includes a current sense resistor coupled to a source of the drive transistor, and the reference voltage includes a voltage drop on the current sense resistor determined based on the target drive current.

Clause 16. The electronic device of any of clauses 1-15, wherein: the power supply interface includes a switched mode converter coupled to a DC power supply; the DC power supply is configured to provide a DC supply voltage to the switched mode converter; and the switched mode converter of the power supply interface is configured to generate the configurable drive voltage.

Clause 17. The electronic device of any of clauses 1-16, further comprising: a camera configured to capture an image of a field of view at a flash rate while the field of view is illuminated by the LED module with the target drive current for a shortened duration of time associated with the flash rate, the flash rate greater than a threshold rate.

Clause 18. The electronic device of any of clauses 1-15, wherein the LED module is constantly powered on during an extended duration of time that is longer than a threshold duration of time.

Clause 19. The electronic device of any of clauses 1-18, further comprising a plurality of illumination units, including a first illumination unit, wherein: the first illumination unit includes the power supply interface, the LED module, and the current source; and the first illumination unit is configured to set the configurable drive voltage of the illumination unit and stabilize the drive current of the LED module at the target drive current of the first illumination unit independently of other illumination units.

Clause 20. The electronic device of clause 19, wherein: the plurality of illumination units is physically arranged to surround a camera lens; each of the plurality of illumination units is configured to be independently controlled to illuminate a distinct region of a field of view based on the target drive current; and the first illumination unit is enabled sequentially or concurrently with a second illumination unit.

Clause 21. A method of providing efficient operation of LEDs, comprising: generating a configurable drive voltage to drive a light emitting diode (LED) module; stabilizing, by a current source, a drive current of the LED module dynamically at a target drive current; and holding an illumination efficiency of an LED operation system, including the LED module and the current source, above a target efficiency level.

Clause 22. The method of clause 21, wherein the current source includes a drive transistor that is coupled in series with the LED module, and holding the illumination efficiency of the LED operation system above the target efficiency level further comprises: controlling the drive transistor to operate in a linear region while stabilizing the drive current of the LED module at the target drive current.

Clause 23. The method of clause 22, further comprising: setting the configurable drive voltage based on the target drive current, wherein the configurable drive voltage is configured to push the drive transistor to operate in a linear region while the drive current of the LED module is stabilized at the target drive current.

Clause 24. The method of any of clauses 21-23, wherein the current source further includes a drive transistor coupled in series with the LED module and a current controller coupled to the drive transistor, the method further comprising: controlling, by the drive transistor, the drive current of the LED module; generating a drive voltage control signal to control sweeping of the configurable drive voltage within a drive voltage range; monitoring, by the current controller, a first voltage of the drive transistor with reference to a reference voltage during sweeping of the configurable drive voltage; and determining, by the current controller, the configurable drive voltage based on a comparison result of the first voltage and the reference voltage.

Clause 25. The method of clause 24, wherein the current source further includes a current sensor resistor coupled to a source of the drive transistor, the method further comprising: providing the reference voltage predefined based on a voltage drop on the current sense resistor and a saturation voltage of the drive transistor, both the voltage drop and the saturation voltage being predefined based on the target drive current.

Clause 26. The method of any of clauses 23-25, wherein the configurable drive voltage is set in accordance with a determination that a temperature deviation from a predefined temperature exceeds a threshold temperature drift.

Clause 27. The method of any of clauses 23-26, further comprising: determining a forward voltage deviation between a voltage drop on the LED module and a predefined forward voltage of the LED module, wherein the configurable drive voltage is set in accordance with a determination that the forward voltage deviation exceeds a threshold forward deviation.

Clause 28. The method of any of clauses 23-27, wherein the configurable drive voltage is automatically set in response to a user instruction received on a user interface of a software application configured to control the LED module.

Clause 29. The method of any of clauses 23-27, wherein the configurable drive voltage is automatically set in response to a user selection of the target drive current among a plurality of predefined drive currents.

Clause 30. The method of clause 29, wherein the plurality of predefined drive currents includes a low drive current, an intermediate drive current greater than the low drive current, and a high drive current greater than the intermediate drive current.

Clause 31. The method of any of clauses 21-30, wherein the current source further includes a drive transistor coupled in series with the LED module and a current controller coupled to the drive transistor, the method further comprising: controlling, by the drive transistor, the drive current of the LED module; and monitoring, by the current controller, a first voltage of the drive transistor with reference to a reference voltage; and generating, by the current controller, a control signal for adjusting the drive current dynamically based on a deviation of the first voltage from the reference voltage.

Clause 32. The method of clause 31, further comprising: adjusting a gate voltage of the drive transistor based on the control signal, thereby adjusting the drive current of the LED module and compensating for the deviation of the first voltage from the reference voltage.

Clause 33. The method of clause 31 or 32, further comprising: adjusting the configurable drive voltage based on the control signal, thereby adjusting the drive current of the LED module and compensating for the deviation of the first voltage from the reference voltage.

Clause 34. The method of any of clauses 31-33, further comprising: obtaining the reference voltage predefined based on a saturation voltage of the drive transistor associated with the target drive current.

Clause 35. The method of any of clauses 31-34, wherein the current source further includes a current sense resistor coupled to a source of the drive transistor, and the reference voltage includes a voltage drop on the current sense resistor determined based on the target drive current.

Clause 36. The method of any of clauses 21-35, wherein the configurable drive voltage is generated by a switched mode converter, the method further comprising: driving the switched mode converter by a DC a power supply providing a DC supply voltage, wherein the configurable drive voltage is lower than the DC supply voltage.

Clause 37. The method of any of clauses 21-36, further comprising: capturing, by a camera, an image of a field of view at a flash rate while the field of view is illuminated by the plurality of LEDs with the target drive current for a shortened duration of time associated with the flash rate, the flash rate greater than a threshold rate.

Clause 38. The method of any of clauses 21-36, wherein the LED module is constantly powered on during an extended duration of time that is longer than a threshold duration of time.

Clause 39. The method of any of clauses 21-38, wherein a plurality of illumination units includes a first illumination unit, and the first illumination unit includes the LED module and the current source, the method further comprising: for each illumination unit distinct from the first illumination unit, setting a configurable drive voltage of the respective illumination unit and stabilizing a drive current of a LED module at a target drive current of the respective illumination unit independently of the first illumination unit.

Clause 40. The method of clause 39, wherein the plurality of illumination units is physically arranged to surround a camera lens, the method further comprising: independently controlling each of the plurality of illumination units to illuminate a distinct region of a field of view based on a same target drive current; and enabling the first illumination unit and a second illumination unit sequentially or concurrently.

Clause 41. A method for providing an electronic device of any of clauses 1-20.

Clause 42. An integrated semiconductor device, comprising: a power supply interface configured to obtain a configurable drive voltage; and a current source coupled to the power supply interface via at least an LED module, wherein the current source is configured to generate a control signal to control the power supply interface, stabilize a drive current of the LED module dynamically at a target drive current, and hold an illumination efficiency of an LED operation system above a target efficiency level, the LED operation system including the LED module and the current source.

Clause 43. An integrated semiconductor device, comprising: a power supply interface configured to provide a configurable drive voltage; an LED module coupled to the power supply interface, wherein the LED module is configured to be driven by the configurable drive voltage; and a current source coupled to the power supply interface via the LED module, wherein the current source is configured to stabilize a drive current of the LED module dynamically at a target drive current and hold an illumination efficiency of an LED operation system above a target efficiency level, the LED operation system including the LED module and the current source.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and "comprising," when used in this specification, specify the presence of stated features, steps, operations, elements, and/or components, but do not preclude the presence or addition of one or more other features, steps, operations, elements, components, and/or groups thereof.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or embodiments.

As used herein, the term "and/or" encompasses any combination of listed elements. For example, "A, B, and/or C" includes the following sets of elements: A only, B only, C only, A and B without C, A and C without B, B and C without A, or a combination of all three elements, A, B, and C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
- a power supply interface configured to provide a configurable drive voltage;
- a light emitting diode (LED) module coupled to the power supply interface, wherein the LED module is configured to be driven by the configurable drive voltage; and
- a current source coupled to the power supply interface and the LED module, wherein the current source is configured to stabilize a drive current of the LED module dynamically at a target drive current and hold an illumination efficiency of an LED operation system above a target efficiency level, the LED operation system including the LED module and the current source, and wherein the current source includes a drive transistor that is coupled in series with the LED module, and the target efficiency level of the LED operation system corresponds to an operating state in which the drive transistor operates in a linear region.

2. The electronic device of claim 1, wherein the current source is configured to hold the illumination efficiency of the LED operation system above the target efficiency level by controlling the drive transistor to operate in the linear region while stabilizing the drive current of the LED module at the target drive current.

3. The electronic device of claim 1, wherein the current source is configured to:
- set the configurable drive voltage based on the target drive current, wherein the configurable drive voltage is configured to push the drive transistor to operate in the linear region while the drive current of the LED module is stabilized at the target drive current.

4. The electronic device of claim 1, wherein the drive transistor is configured to control the drive current of the LED module, and the current source further comprises:
- a current controller coupled to the drive transistor, the current controller configured to:
  - generate a drive voltage control signal to control sweeping of the configurable drive voltage within a drive voltage range;
  - monitor a first voltage of the drive transistor with reference to a reference voltage during sweeping of the configurable drive voltage; and
  - determine the configurable drive voltage based on a comparison result of the first voltage and the reference voltage.

5. The electronic device of claim 4, wherein the current source further includes a current sense resistor coupled to a source of the drive transistor, and the reference voltage is predefined based on (i) a voltage drop on the current sense resistor and (ii) a saturation voltage of the drive transistor, both the voltage drop and the saturation voltage being predefined based on the target drive current.

6. The electronic device of claim 5, wherein the configurable drive voltage is set in accordance with a determination that a temperature deviation from a predefined temperature exceeds a threshold temperature drift.

7. The electronic device of claim 6, wherein the current controller is configured to determine a forward voltage deviation between a voltage drop on the LED module and a predefined forward voltage of the LED module, and the configurable drive voltage is set in accordance with a determination that the forward voltage deviation exceeds a threshold forward deviation.

8. The electronic device of claim 1, wherein the configurable drive voltage is automatically set in response to user instruction received on a user interface of a software application configured to control the LED module.

9. The electronic device of claim 1, wherein the configurable drive voltage is automatically set in response to user selection of the target drive current among a plurality of predefined drive currents.

10. The electronic device of claim 9, wherein the plurality of predefined drive currents includes a low drive current, an intermediate drive current greater than the low drive current, and a high drive current greater than the intermediate drive current.

11. A method of providing efficient operation of LEDs, comprising:
- providing a configurable drive voltage to drive a light emitting diode (LED) module;
- stabilizing, by a current source, a drive current of the LED module dynamically at a target drive current; and
- holding an illumination efficiency of an LED operation system, including the LED module and the current source, above a target efficiency level;
- wherein the current source includes a drive transistor that is coupled in series with the LED module, and the target efficiency level of the LED operation system corresponds to an operating state in which the drive transistor operates in a linear region.

12. The method of claim 11, wherein the current source further includes a current controller coupled to the drive transistor, the method further comprising:
- controlling, by the drive transistor, the drive current of the LED module; and
- monitoring, by the current controller, a first voltage of the drive transistor with reference to a reference voltage; and
- generating, by the current controller, a control signal for adjusting the drive current dynamically based on a deviation of the first voltage from the reference voltage.

13. The method of claim 12, further comprising: adjusting a gate voltage of the drive transistor based on the control signal, thereby adjusting the drive current of the LED module and compensating for the deviation of the first voltage from the reference voltage.

14. The method of claim 12, further comprising: adjusting the configurable drive voltage based on the control signal, thereby adjusting the drive current of the LED module and compensating for the deviation of the first voltage from the reference voltage.

15. The method of claim 12, further comprising: obtaining the reference voltage predefined based on a saturation voltage of the drive transistor associated with the target drive current.

16. The method of claim 12, wherein the current source further includes a current sense resistor coupled to a source of the drive transistor, and the reference voltage includes a voltage drop on the current sense resistor determined based on the target drive current.

17. The method of claim 11, wherein the configurable drive voltage is generated by a switched mode converter, the method further comprising: driving the switched mode converter by a DC a power supply providing a DC supply voltage, wherein the configurable drive voltage is lower than the DC supply voltage.

18. The method of claim 11, further comprising: capturing, by a camera, an image of a field of view at a flash rate while the field of view is illuminated by a plurality of LEDs of the LED module with the target drive current for a shortened duration of time associated with the flash rate, the flash rate greater than a threshold rate.

19. The method of claim 11, wherein a plurality of illumination units includes a first illumination unit, and the first illumination unit includes the LED module and the current source, the method further comprising: for each illumination unit distinct from the first illumination unit, setting a configurable drive voltage of the respective illumination unit and stabilizing a drive current of a LED module of the respective illumination unit at a target drive current of the respective illumination unit independently of the first illumination unit.

20. The method of claim 19, wherein the plurality of illumination units is physically arranged to surround a camera lens, the method further comprising: independently controlling each of the plurality of illumination units to illuminate a distinct region of a field of view based on a same target drive current; and enabling the first illumination unit and a second illumination unit sequentially or concurrently.

* * * * *